(12) United States Patent
White

(10) Patent No.: US 11,745,778 B2
(45) Date of Patent: Sep. 5, 2023

(54) LOAD WHEEL DESIGNS FOR PALLET ENTRY

(71) Applicant: Hyster-Yale Group, Inc., Fairview, OR (US)

(72) Inventor: Andrew White, Whitchurch (GB)

(73) Assignee: Hyster-Yale Group, Inc., Fairview, OR (US)

( * ) Notice: Subject to any disclaimer, the term of this patent is extended or adjusted under 35 U.S.C. 154(b) by 583 days.

(21) Appl. No.: 16/656,854

(22) Filed: Oct. 18, 2019

(65) Prior Publication Data

US 2021/0114644 A1  Apr. 22, 2021

(51) Int. Cl.
*B62B 3/06* (2006.01)
*B65G 7/04* (2006.01)
*B66F 9/22* (2006.01)

(52) U.S. Cl.
CPC .......... *B62B 3/0618* (2013.01); *B62B 3/0625* (2013.01); *B62B 3/0637* (2013.01); *B65G 7/04* (2013.01); *B66F 9/22* (2013.01); *B65G 2201/0267* (2013.01)

(58) Field of Classification Search
CPC ... B62B 3/0618; B62B 3/0625; B62B 3/0637; B62B 2301/256; B62B 5/026; B62B 3/06; B62B 2203/20; B62B 3/0631; B62B 3/0612; B62B 2203/28; B62B 2203/24; B65G 7/04; B65G 2201/0267; B66F 9/22; B66F 9/12; B60L 2200/42
See application file for complete search history.

(56) References Cited

U.S. PATENT DOCUMENTS

| 2,986,225 | A |   | 5/1961 | Travaglio | |
| 3,019,930 | A | * | 2/1962 | Allen | B62B 3/0618 414/667 |
| 4,027,771 | A | * | 6/1977 | Adams | B62B 3/0625 280/43.12 |
| 8,752,846 | B1 | * | 6/2014 | White | B66F 9/12 280/43.12 |
| 2002/0034431 | A1 | * | 3/2002 | Fransson | B62B 3/0618 414/495 |
| 2006/0232030 | A1 | * | 10/2006 | Passeri | B62B 3/0612 280/43.12 |

(Continued)

FOREIGN PATENT DOCUMENTS

| CN | 102119086 A | * | 7/2011 | ............. A63C 17/10 |
| CN | 202968023 U | * | 6/2013 | |

(Continued)

OTHER PUBLICATIONS

Translated CN-109205525-A (Year: 2022).*

(Continued)

*Primary Examiner* — Brian L Swenson
*Assistant Examiner* — Ian Bryce Shelton

(57) ABSTRACT

A load wheel assembly for an elongate fork of a forked material-handling vehicle with a chassis employs a non-motorized forward load wheel, a non-motorized rear load wheel, and a non-motorized torque-coupling assembly connected between the forward load wheel and the rear load wheel for coupling torque between the forward load wheel and the rear load wheel to overcome obstacles on a surface, such as a floor.

41 Claims, 15 Drawing Sheets

(56) References Cited

U.S. PATENT DOCUMENTS

| | | | |
|---|---|---|---|
| 2011/0175304 A1* | 7/2011 | Arbogast | B62D 55/04 305/129 |
| 2014/0159329 A1 | 6/2014 | White | |
| 2018/0327239 A1* | 11/2018 | Cherry | B66F 9/12 |

FOREIGN PATENT DOCUMENTS

| | | | | |
|---|---|---|---|---|
| CN | 203449855 U | * | 2/2014 | |
| CN | 104228454 A | * | 12/2014 | |
| CN | 104649183 A | * | 5/2015 | |
| CN | 104860231 A | * | 8/2015 | |
| CN | 204607515 U | * | 9/2015 | |
| CN | 204675773 U | * | 9/2015 | |
| CN | 105399012 A | | 3/2016 | |
| CN | 105752886 A | | 7/2016 | |
| CN | 105752886 A | * | 7/2016 | B66F 9/075 |
| CN | 106143567 A | * | 11/2016 | B62B 5/0033 |
| CN | 106365072 A | * | 2/2017 | |
| CN | 107285241 A | * | 10/2017 | |
| CN | 206799098 U | * | 12/2017 | |
| CN | 108821187 A | * | 11/2018 | B66F 9/075 |
| CN | 109205525 A | * | 1/2019 | |
| DE | 9017430 U1 | | 5/1991 | |
| DE | 19615592 A1 | * | 10/1997 | B62B 3/0625 |
| DE | 29911310 U1 | | 5/2000 | |
| DE | 29911310 U1 | * | 5/2000 | B62B 3/06 |
| DE | 102006035822 A1 | * | 2/2008 | B62B 3/06 |
| DE | 202009008021 U1 | * | 12/2009 | B66C 17/20 |
| DE | 102013103200 A1 | * | 10/2014 | B60K 1/04 |
| DE | 102016107538 A1 | | 10/2017 | |
| EP | 0903277 A2 | * | 3/1999 | |
| EP | 1413496 A1 | * | 4/2004 | B62B 3/0612 |
| EP | 1967484 A1 | | 9/2008 | |
| EP | 1967484 A1 | * | 9/2008 | B62B 3/0612 |
| EP | 2020358 A2 | * | 2/2009 | B62B 3/0612 |
| EP | 3251918 A1 | * | 12/2017 | B62B 3/06 |
| EP | 3415401 A1 | * | 12/2018 | B62B 3/0612 |
| EP | 3466794 A1 | * | 4/2019 | |
| ES | 2394920 T3 | * | 2/2013 | B60G 21/051 |
| FR | 1381775 A | | 12/1964 | |
| FR | 2890064 A1 | * | 3/2007 | B62B 3/06 |
| FR | 2930230 A1 | * | 10/2009 | A63C 17/10 |
| FR | 2941428 A1 | * | 7/2010 | A63C 17/10 |
| GB | 2470236 A | | 11/2010 | |
| GB | 2494662 A | | 3/2013 | |
| JP | S5168153 A | | 6/1976 | |
| JP | S604401 U | | 1/1985 | |
| JP | 2004017791 A | | 1/2004 | |
| JP | 2006089006 A | * | 4/2006 | |
| JP | 2006089006 A | | 4/2006 | |
| JP | 2012188182 A | * | 10/2012 | |
| JP | 2015127188 A | | 7/2015 | |
| WO | 8204230 A1 | | 12/1982 | |
| WO | 03068659 A1 | | 8/2003 | |
| WO | WO-2009133319 A2 | * | 11/2009 | A63C 17/10 |
| WO | 2010008326 A1 | | 1/2010 | |
| WO | WO-2011129692 A1 | * | 10/2011 | B62B 3/06 |
| WO | WO-2012106756 A1 | * | 8/2012 | A61G 5/04 |

OTHER PUBLICATIONS

European Search Report, EPO Patent Appl. No. 20163601.6-1012 (dated Oct. 5, 2020).

Shin-Ichiro Nishida, Yuku Okbayashi, Sachiko Wakabayashi; "Analyses and Testing of New Mobility System for Lunar Rover"; Proceedings of the 2011 IEEE Int'l Conf. on Robotics and Bimimetics; Dec. 7-11, 2011.

China Nat'l Intellectual Property Admin., Patent Appl. No. 2019112560609, First Office Action (dated Feb. 22, 2022).

China Nat'l Intellectual Property Admin., Patent Appl. 2019112560609, Response to First Office Action (dated May 5, 2022).

China Nat'l Intellectual Property Admin., Patent Appl. 2019112560609, Second Office Action (dated May 23, 2022).

China Nat'l Intellectual Property Admin., Patent Appl. 2019112560609, Response to Second Office Action (dated Aug. 8, 2022).

European Patent Office, Patent Appl. 20163601.6, Response to European Extended Search Report (dated Oct. 21, 2021).

EPO, Appl. 20163601.6; Office Action (dated Dec. 7, 2022).

* cited by examiner

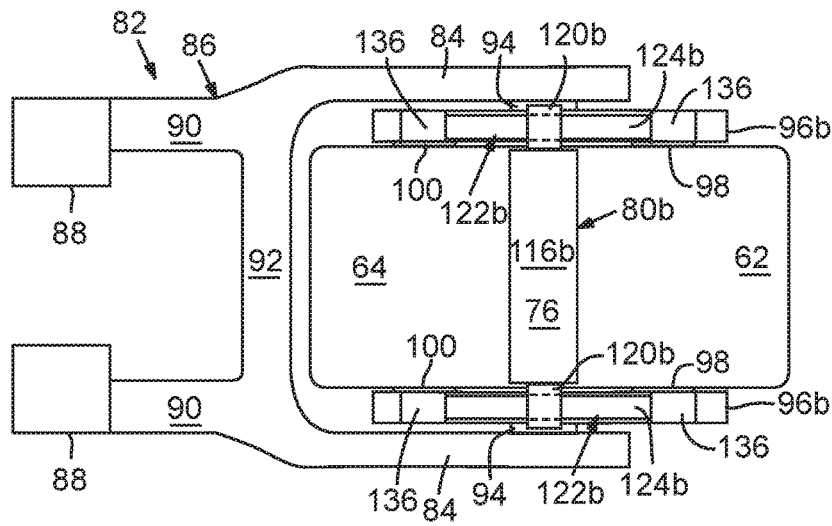
FIG. 6A
FIG. 6B
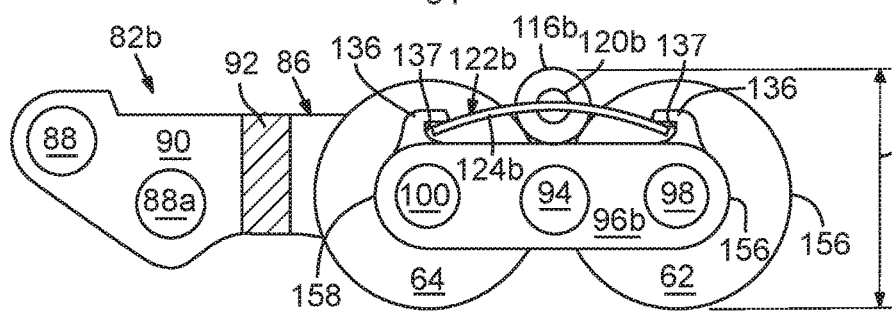
FIG. 6C
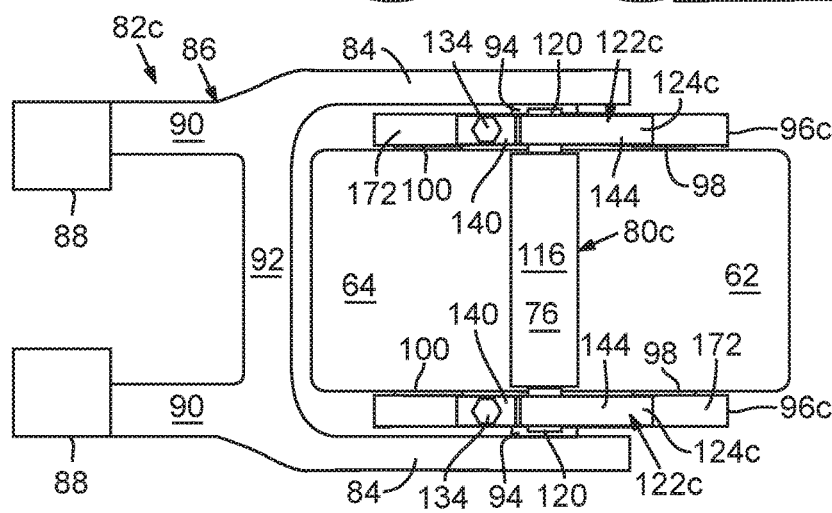
FIG. 7A
FIG. 7C
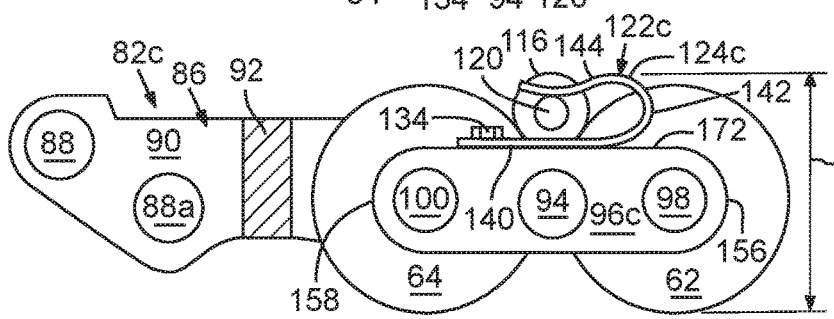
FIG. 7B

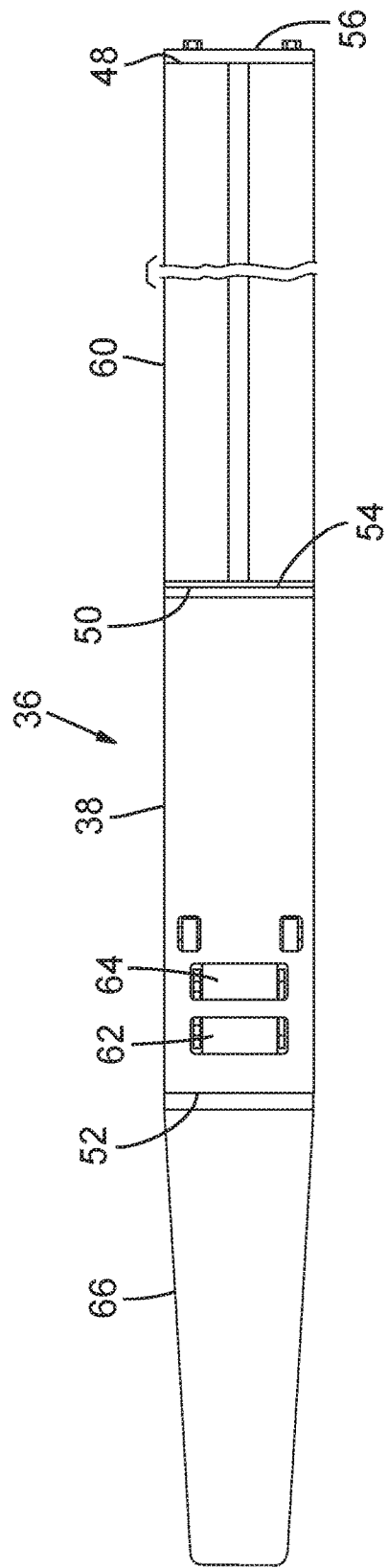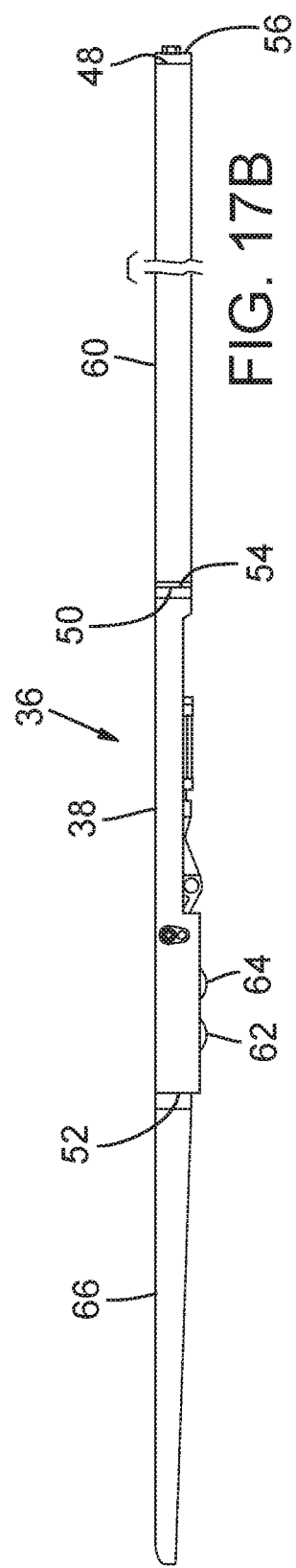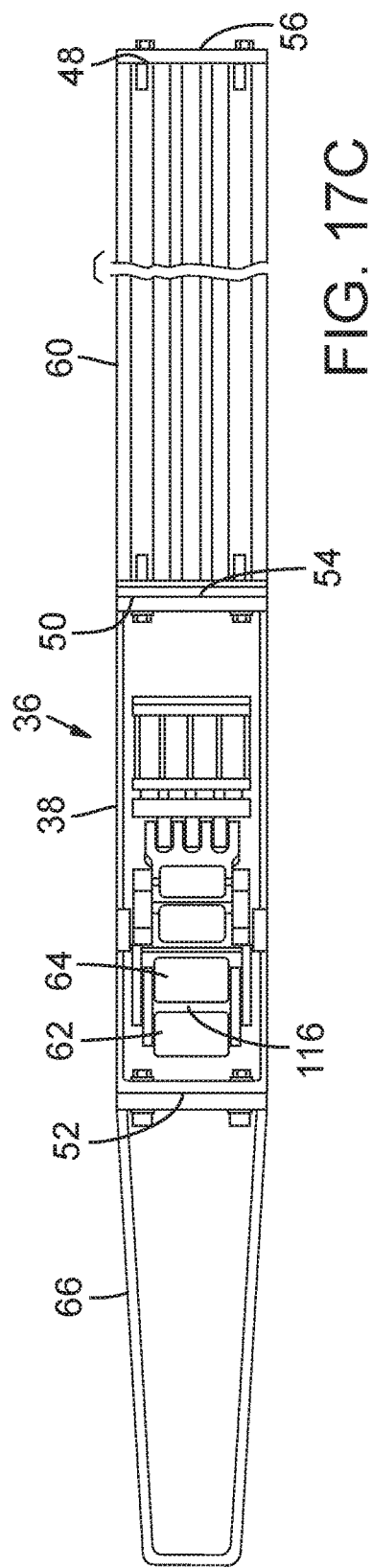

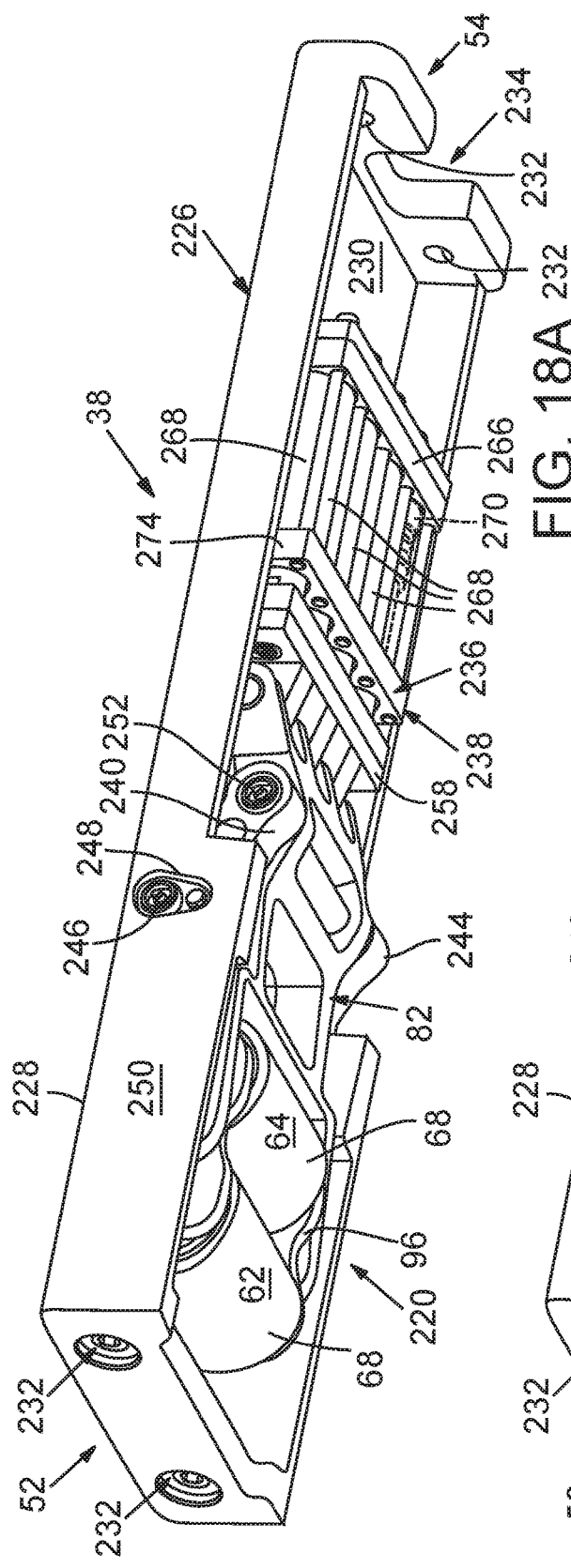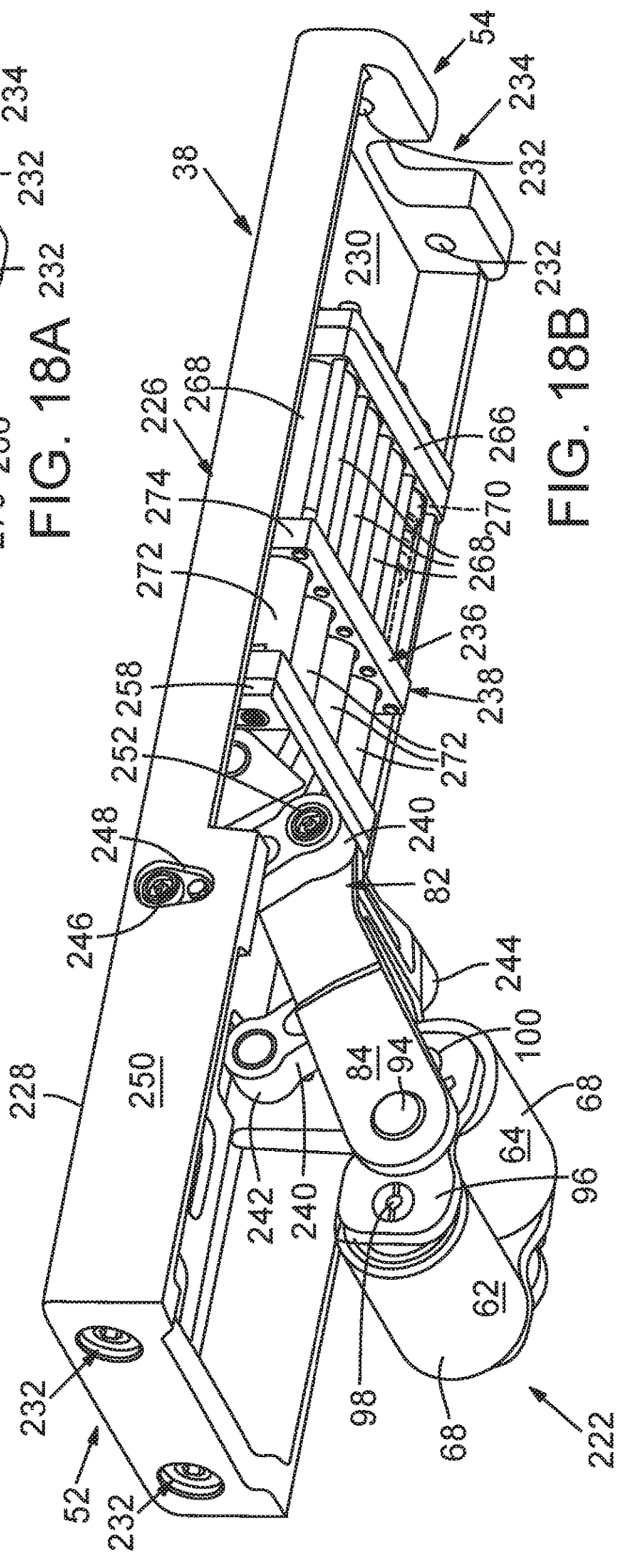

LOAD WHEEL DESIGNS FOR PALLET ENTRY

TECHNICAL FIELD

This application relates to systems and methods for improving load wheel performance and, in particular, to systems and methods for coupling torque between load wheels on the forks of pallet trucks.

BACKGROUND INFORMATION

Material-handling vehicles include class III trucks, such as forked vehicles, and are presented herein only by way of example to pallet trucks. Typical pallet trucks support one, two in-line, or three in-line standard size pallets. Typically, pallet trucks include lifting load forks that are connected at their rear end or heel end to a chassis or battery box. The front end of each fork typically includes one or more support rollers, commonly called load wheels. A hydraulic system, which is located in proximity to the chassis or battery box, operates a lifting mechanism that moves the load wheels and lifts the chassis or battery box and the forks together with goods, such as pallets loaded thereon. The load wheels are typically coupled to the lift mechanism by a mechanical linkage that transmits force from a hydraulic lifting cylinder to the load wheels. A valve arrangement is provided to relieve the hydraulic pressure in the lifting cylinder, thus lowering and placing the load on the floor. Steer wheels are located behind the battery box. A steering mechanism, such as a tiller, also may be provided to steer the steer wheels relative to the chassis and forks.

Current material-handling trucks have a low success rate of entering or exiting an empty or lightly-loaded (25 kg or less) closed-bottom pallet. More often than not, the front load wheel jams against the bottom board, causing the pallet to be pushed along the ground rather than having the forks enter the pallet as intended. Such pushing the pallet along the ground is undesirable because the horizontal surface on which the pallet sits can be damaged and/or the bottom board of the pallet can be damaged, reducing its useful life. The success rate appears to depend on several factors such as driver skill, pallet weight, pallet condition, friction between ground and pallet, etc. Also, failure to enter the pallet prevents the pallet from being retrieved. Moreover, failure to exit an empty pallet results in the pallet being trapped on the forks, rendering the truck useless until the pallet is removed.

OVERVIEW OF DISCLOSURE

This overview is provided to introduce a selection of concepts in a simplified form that are further described in greater detail below. This overview is not intended to identify key or essential inventive concepts of the claimed subject matter, nor is it intended for limiting the scope of the claimed subject matter. Some example embodiments, alternative embodiments, and selectively cumulative embodiments are set forth below:

In some embodiments, a load wheel assembly for an elongate fork of a forked material-handling vehicle with a chassis comprises a forward load wheel, a rear load wheel, and means for coupling torque between the forward load wheel and the rear load wheel, wherein the fork has a proximal end and a distal end, wherein the proximal end of the fork is configured for direct or indirect attachment to the chassis, and wherein the load wheel assembly is configured for connection to the fork closer to the distal end than to the proximal end.

In some additional, alternative, or selectively cumulative embodiments, a load wheel assembly for an elongate fork of a forked material-handling vehicle with a chassis comprises a forward load wheel, a rear load wheel, and a torque-coupling assembly connected between the forward load wheel and the rear load wheel, wherein the fork has a proximal end and a distal end, wherein the proximal end of the fork is configured for direct or indirect attachment to the chassis, and wherein the load wheel assembly is configured for connection to the fork closer to the distal end than to the proximal end.

In some additional, alternative, or selectively cumulative embodiments, a method for moving a fork of a forked material-handling vehicle across a surface employs a forked material-handling vehicle having a chassis, wherein the fork has a proximal end and a distal end, wherein the proximal end of the fork is configured for direct or indirect attachment to the chassis, wherein the fork has a forward wheel and a rear wheel, wherein the forward wheel is nearer than the rear wheel to the distal end, and wherein the rear wheel is nearer than the forward wheel to the proximal end. The method comprises rolling the forward wheel on the floor as the fork moves forward in the distal direction; rolling the rear wheel on the surface as the fork moves forward in the distal direction; and in response to the forward wheel hitting an obstacle on the surface that hinders turning of the forward wheel, transferring torque from the rear wheel to the forward wheel to thereby enable the forward wheel to roll over the obstacle.

In some additional, alternative, or selectively cumulative embodiments, an elongate body of a fork of a forked material-handling vehicle with a chassis comprises a body proximal end and a body distal end, wherein the body proximal end is suitable for direct or indirect support by, or attachment to, the chassis; a load wheel assembly operatively connected to the elongate body, wherein the load wheel assembly is directly or indirectly connected to the elongate body closer to the body distal end than to the body proximal end, wherein the load wheel assembly includes a forward load wheel and a rear load wheel; and a torque-coupling assembly adapted to couple torque between the forward load wheel and the rear load wheel.

In some additional, alternative, or selectively cumulative embodiments, a fork for a forked material-handling vehicle comprises a discrete elongate body; a load wheel module, including a load wheel assembly having a forward load wheel, a rear load wheel, and a torque-coupling assembly connected between the forward load wheel and the rear load wheel; and a fork tip.

In some additional, alternative, or selectively cumulative embodiments, a fork assembly for a forked material-handling vehicle with a chassis comprises a pair of elongate bodies, each elongate body comprising: a body proximal end and a body distal end, wherein the body proximal end is suitable for direct or indirect support by, or attachment to, the chassis; a load wheel assembly operatively connected to the elongate body, wherein the load wheel assembly is directly or indirectly connected to the elongate body closer to the body distal end than to the body proximal end, wherein the load wheel assembly includes a forward load wheel and a rear load wheel; and a torque-coupling assembly adapted to couple torque between the forward load wheel and the rear load wheel.

In some additional, alternative, or selectively cumulative embodiments, a load wheel assembly for an elongate fork of a forked material-handling vehicle with a chassis comprises a non-motorized forward load wheel; a non-motorized rear load wheel; and a non-motorized torque-coupling assembly connected between the forward load wheel and the rear load wheel, wherein the fork has a proximal end and a distal end, wherein the proximal end of the fork is configured for direct or indirect attachment to the chassis, and wherein the load wheel assembly is configured for connection to the fork closer to the distal end than to the proximal end.

In some additional, alternative, or selectively cumulative embodiments, a load wheel assembly for an elongate fork of a forked material-handling vehicle with a chassis comprises a forward load wheel having a forward load wheel surface; a rear load wheel having a rear load wheel surface; and a torque-coupling assembly connected between the forward load wheel and the rear load wheel, wherein the torque-coupling assembly includes a coupling wheel (or idler wheel) having a coupling wheel surface, and wherein the coupling wheel surface has direct contact with the forward load wheel surface and the rear load wheel surface, wherein the fork has a proximal end and a distal end, wherein the proximal end of the fork is configured for direct or indirect attachment to the chassis, and wherein the load wheel assembly is configured for connection to the fork closer to the distal end than to the proximal end.

In some additional, alternative, or selectively cumulative embodiments, a load wheel assembly for an elongate fork of a forked material-handling vehicle with a chassis comprises a forward load wheel having a forward rotation axle having a forward first end and a forward second end; a rear load wheel having a rear rotation axle having a rear first end and a rear second end; a first wheel carrier having a forward connection point and a rear connection point, wherein the forward first end of the forward first rotation axle is rotatably connected to the forward connection point of the first wheel carrier, and wherein the rear first end of the rear rotation axle is rotatably connected to the rear connection point of the first wheel carrier wherein the first wheel carrier is configured to pivotably connect to the fork; a second wheel carrier having a forward connection point and a rear connection point, wherein the forward second end of the forward rotation axle is rotatably connected to the forward connection point of the second wheel carrier, and wherein the rear second end of the rear rotation axle is rotatably connected to the rear connection point of the second wheel carrier, wherein the second wheel carrier is configured to pivotably connect to the fork; and a torque-coupling assembly connected between the forward load wheel and the rear load wheel, wherein the fork has a proximal end and a distal end, wherein the proximal end of the fork is configured for direct or indirect attachment to the chassis, wherein the load wheel assembly is configured for connection to the fork closer to the distal end than to the proximal end.

In some additional, alternative, or selectively cumulative embodiments, a load wheel assembly for an elongate fork of a forked material-handling vehicle with a chassis comprises a forward load wheel; a rear load wheel; a torque-coupling assembly connected between the forward load wheel and the rear load wheel, wherein the torque-coupling assembly includes a force-applying coupling assembly configured to elastically couple torque between the forward load wheel and the rear load wheel, wherein the fork has a proximal end and a distal end, wherein the proximal end of the fork is configured for direct or indirect attachment to the chassis, and wherein the load wheel assembly is configured for connection to the fork closer to the distal end than to the proximal end.

In some additional, alternative, or selectively cumulative embodiments, a method for employing a fork of a forked material-handling vehicle to engage a closed pallet including a bottom slat resting on a floor and a top slat for supporting a load, utilizes a forked material-handling vehicle with a chassis, wherein the fork has a proximal end and a distal end, wherein the proximal end of the fork being attached directly or indirectly to the chassis, wherein the fork having a forward wheel and a rear wheel, the forward wheel being nearer than the rear wheel to the distal end, and wherein the rear wheel being nearer than the forward wheel to the proximal end. The method comprises rolling the forward wheel on the floor as the fork moves forward in the distal direction; rolling the rear wheel on the floor as the fork moves forward in the distal direction; and in response to the forward wheel hitting the slat that hinders turning of the forward wheel, transferring torque from the rear wheel to the forward wheel to thereby enable the forward wheel to roll over the bottom slat and beneath the top slat.

In some additional, alternative, or selectively cumulative embodiments, a fork assembly for a forked material-handling vehicle comprises a discrete elongate body; a discrete load wheel module, including a load wheel assembly having a forward load wheel, a rear load wheel, and a torque-coupling assembly connected between the forward load wheel and the rear load wheel; a first interlocking mechanism detachably connecting the elongate body to the load wheel module; a discrete fork tip; and a second interlocking mechanism detachably connecting the load wheel module to the fork tip.

In some additional, alternative, or selectively cumulative embodiments, a load wheel module for a fork assembly for a forked material-handling truck comprises a frame; a load wheel assembly operatively connected to the frame, the load wheel assembly having a forward load wheel, a rear load wheel, and a torque-coupling assembly connected between the forward load wheel and the rear load wheel; and a hydraulic actuator contained within the frame and operatively connected to the load wheel assembly to lower the load wheel hydraulically.

In some additional, alternative, or selectively cumulative embodiments, a pallet truck comprises a steer wheel; a chassis operatively connected to the steer wheel; and substantially parallel first and second forks operatively connected to and extending from the chassis and configured to hold a load for conveyance by the pallet truck as the pallet truck moves, wherein the first fork comprises a first elongate body, a first load wheel assembly, and a first fork tip, wherein the second fork comprises a second elongate body, a second load wheel assembly, and a second fork tip, wherein the first load wheel assembly comprises a first forward load wheel, a first rear load wheel, and a first torque-coupling assembly connected between the first forward load wheel and the first rear load wheel, and wherein the second load wheel assembly comprises a second forward load wheel, a second rear load wheel, and a second torque-coupling assembly connected between the second forward load wheel and the second rear load wheel.

In some additional, alternative, or selectively cumulative embodiments, the load wheel assembly further comprises a non-motorized lead-entry roller positioned forward from the non-motorized forward load wheel. The lead-entry roller may be in the form of a paddle wheel having multiple paddles or may have other features on its surface, such ridges, bumps, a tire, or other surface texture to enable it to grip and climb over an obstacle, such as a base board, on the floor, rather than push it horizontally. The load wheel assembly can optionally further comprise a non-motorized torque-coupling assembly connected between the non-motorized lead-entry roller and one or more of the forward load wheel and the rear load wheel. Examples of suitable torque-coupling assemblies include one or more chains or belts, such as toothed belts, and gears.

In some additional, alternative, or selectively cumulative embodiments, a load wheel assembly for an elongate fork of a forked material-handling vehicle with a chassis comprises a non-motorized forward load wheel; a non-motorized rear load wheel; and a non-motorized lead-entry roller positioned forward from the non-motorized forward load wheel.

In some additional, alternative, or selectively cumulative embodiments, a load wheel assembly for an elongate fork of a forked material-handling vehicle with a chassis comprises a forward load wheel; a rear load wheel, wherein the fork has a proximal end and a distal end, wherein the proximal end of the fork is configured for direct or indirect attachment to the chassis, wherein the load wheel assembly is configured for connection to the fork closer to the distal end than to the proximal end; and a torque-coupling means connected between the forward load wheel and the rear load wheel to couple torque between the forward load wheel and the rear load wheel, wherein the torque-coupling means comprises a force-applying coupling means configured to elastically couple torque between the forward load wheel and the rear load wheel.

In some additional, alternative, or selectively cumulative embodiments, a load wheel assembly for an elongate fork of a forked material-handling vehicle having a chassis comprises a non-motorized forward load wheel; a non-motorized rear load wheel, wherein fork has a proximal end and a distal end, wherein the proximal end of the fork is configured for direct or indirect attachment to the chassis, and wherein the load wheel assembly is configured for connection to the fork closer to the distal end than to the proximal end; and a non-motorized means for coupling torque between the forward load wheel and the rear load wheel.

In some additional, alternative, or selectively cumulative embodiments, the torque-coupling assembly comprises a torque-coupling means for coupling torque between the forward load wheel and the rear load wheel.

In some additional, alternative, or selectively cumulative embodiments, the torque-coupling assembly comprises an idler wheel.

In some additional, alternative, or selectively cumulative embodiments, the idler wheel comprises a tire.

In some additional, alternative, or selectively cumulative embodiments, the idler wheel comprises a solid core.

In some additional, alternative, or selectively cumulative embodiments, the idler wheel comprises a pneumatic core.

In some additional, alternative, or selectively cumulative embodiments, the torque-coupling assembly comprises a polymer.

In some additional, alternative, or selectively cumulative embodiments, the tire comprises a polymer.

In some additional, alternative, or selectively cumulative embodiments, the idler wheel comprises polyurethane.

In some additional, alternative, or selectively cumulative embodiments, the tire comprises polyurethane.

In some additional, alternative, or selectively cumulative embodiments, the forward load wheel has a forward load wheel surface, wherein the rear load wheel has a rear load wheel surface, and wherein at least one of the forward load wheel surface and the rear load wheel surface comprises a non-smooth texture.

In some additional, alternative, or selectively cumulative embodiments, the torque-coupling assembly includes an idler wheel having an idler wheel surface that has direct contact with the forward load wheel surface and the rear load wheel surface.

In some additional, alternative, or selectively cumulative embodiments, the forward load wheel comprises a non-motorized forward load wheel, the rear load wheel comprises a non-motorized rear load wheel, and the torque-coupling assembly comprises a non-motorized torque-coupling assembly.

In some additional, alternative, or selectively cumulative embodiments, the forward load wheel is non-motorized, the rear load wheel is non-motorized, and the torque-coupling is a non-motorized.

In some additional, alternative, or selectively cumulative embodiments, the forward load wheel has a forward axle having a forward first end and a forward second end, and the rear wheel has a rear axle having a rear first end and a rear second end, wherein a first wheel carrier has a forward connection point and a rear connection point, wherein the forward first end of the forward first axle is rotatably connected to the forward connection point of the first wheel carrier, and wherein the rear first end of the rear axle is rotatably connected to the rear connection point of the first wheel carrier, wherein a second wheel carrier has a forward connection point and a rear connection point, wherein the forward second end of the forward axle is rotatably connected to the forward connection point of the second wheel carrier, and wherein the rear second end of the rear rotation axle is rotatably connected to the rear connection point of the second wheel carrier.

In some additional, alternative, or selectively cumulative embodiments, the first wheel carrier is configured to pivotably connect directly or indirectly to the fork of the forked material-handling vehicle, and/or wherein the second wheel carrier is configured to pivotably connect directly or indirectly to the fork of the forked material-handling vehicle.

In some additional, alternative, or selectively cumulative embodiments, the torque-coupling assembly comprises an idler wheel having grooves, tread voids, or surface features.

In some additional, alternative, or selectively cumulative embodiments, the torque-coupling assembly comprises a metallic idler wheel.

In some additional, alternative, or selectively cumulative embodiments, the torque-coupling assembly is positioned above the forward load wheel and the rear load wheel.

In some additional, alternative, or selectively cumulative embodiments, the forward load wheel has a forward wheel radius, the rear load wheel has a rear wheel radius, the idler wheel has an idler wheel diameter, and the idler wheel diameter is shorter than or equal to the forward wheel radius and/or the rear wheel radius.

In some additional, alternative, or selectively cumulative embodiments, the forward load wheel has a forward wheel height above the ground, the rear load wheel has a rear wheel height above the ground, the idler wheel has an idler wheel height above the ground, and the idler wheel height is shorter than or equal to the forward wheel height and/or the rear wheel height.

In some additional, alternative, or selectively cumulative embodiments, the forward load wheel has a forward wheel height above the ground, the rear load wheel has a rear wheel height above the ground, the idler wheel has an idler wheel height above the ground, and the idler wheel height is within 5% of the forward wheel height and/or the rear wheel height.

In some additional, alternative, or selectively cumulative embodiments, the torque-coupling assembly comprises a force-applying coupling assembly (or a force-applying coupler) configured to couple torque between the forward load wheel and the rear load wheel.

In some additional, alternative, or selectively cumulative embodiments, the torque-coupling assembly comprises a force-applying coupling means configured to couple torque between the forward load wheel and the rear load wheel.

In some additional, alternative, or selectively cumulative embodiments, the torque-coupling assembly comprises a resilient force-applying coupling assembly (or a resilient force-applying coupler) configured to elastically couple torque between the forward load wheel and the rear load wheel.

In some additional, alternative, or selectively cumulative embodiments, the torque-coupling assembly comprises a resilient force-applying coupling means configured to elastically couple torque between the forward load wheel and the rear load wheel.

In some additional, alternative, or selectively cumulative embodiments, the force-applying coupling assembly is configured to continuously elastically couple torque between the forward load wheel and the rear load wheel.

In some additional, alternative, or selectively cumulative embodiments, the force-applying coupling assembly comprises a torsion spring.

In some additional, alternative, or selectively cumulative embodiments, the force-applying coupling assembly comprises a tension spring.

In some additional, alternative, or selectively cumulative embodiments, force-applying coupling assembly comprises one or more leaf springs.

In some additional, alternative, or selectively cumulative embodiments, force-applying coupling assembly comprises one or more spring plates.

In some additional, alternative, or selectively cumulative embodiments, force-applying coupling assembly comprises a tension plate.

In some additional, alternative, or selectively cumulative embodiments, force-applying coupling assembly comprises a spring-loaded clip.

In some additional, alternative, or selectively cumulative embodiments, the forward load wheel has a forward axle assembly, the rear wheel has a rear axle assembly, the idler wheel has an idler axle, the torque-coupling assembly is indirectly connected to the idler axle, and the torque-coupling assembly at least partly directly or indirectly surrounds the forward axle assembly or the rear axle assembly.

In some additional, alternative, or selectively cumulative embodiments, the forward load wheel has a forward axle assembly, the rear wheel has a rear axle assembly, the idler wheel has an idler axle, the force-applying coupling assembly comprises a torsion spring directly or indirectly connected to the idler axle, and the torsion spring at least partly directly or indirectly surrounds the forward axle assembly or the rear axle assembly.

In some additional, alternative, or selectively cumulative embodiments, the force-applying coupling assembly is connected directly or indirectly to the first wheel carrier or the second wheel carrier.

In some additional, alternative, or selectively cumulative embodiments, the torsion spring is connected directly or indirectly to the first wheel carrier or the second wheel carrier.

In some additional, alternative, or selectively cumulative embodiments, the first wheel carrier and/or the second wheel carrier has a forward pocket and a rear pocket positioned higher than the respective forward load wheel and the rear load wheel, and the torque-coupling assembly extends from the forward pocket to the rear pocket and arcs over at least a portion of the idler axle forcing (or tensioning) the idler axle toward the forward load wheel and the rear load wheel.

In some additional, alternative, or selectively cumulative embodiments, the first wheel carrier and/or the second wheel carrier has a forward pocket and a rear pocket positioned higher than the respective forward load wheel and the rear load wheel, and the force-applying coupling assembly extends from the forward pocket to the rear pocket and arcs over at least a portion of the idler axle forcing (or tensioning) the idler axle toward the forward load wheel and the rear load wheel.

In some additional, alternative, or selectively cumulative embodiments, the idler axle comprises an idler slot, and a portion of the force-applying coupling assembly passes through the idler slot.

In some additional, alternative, or selectively cumulative embodiments, the idler axle comprises an idler slot, and one or more of the leaf springs pass through the idler slot.

In some additional, alternative, or selectively cumulative embodiments, force-applying coupling assembly comprises fastener slots adapted to receive a fastener that secures the force-applying coupling assembly to the wheel carrier.

In some additional, alternative, or selectively cumulative embodiments, one or more of the leaf springs include a fastener slot, and wherein a fastener is positioned through the fastener slot to secures the leaf spring to the wheel carrier.

In some additional, alternative, or selectively cumulative embodiments, the force-applying coupling assembly comprises multiple compression springs.

In some additional, alternative, or selectively cumulative embodiments, the torque-coupling assembly comprises a tension plate that covers at least a portion of the idler axle and is pressed toward to the first wheel carrier or the second wheel carrier.

In some additional, alternative, or selectively cumulative embodiments, the force-applying coupling assembly comprises a tension plate that covers at least a portion of the idler axle and is pressed toward to the first wheel carrier or the second wheel carrier.

In some additional, alternative, or selectively cumulative embodiments, the tension plate has a flat level portion over the idler axle.

In some additional, alternative, or selectively cumulative embodiments, the force-applying coupling assembly comprises one or more compression springs to press the tension plate toward the first wheel carrier or the second wheel carrier.

In some additional, alternative, or selectively cumulative embodiments, the spring-loaded clip is attached to one or both of forward and rear portions of the first wheel carrier or the second wheel carrier.

In some additional, alternative, or selectively cumulative embodiments, force-applying coupling assembly is attached to both forward and rear portions of the first wheel carrier or the second wheel carrier.

In some additional, alternative, or selectively cumulative embodiments, force-applying coupling assembly is bolted to both forward and rear portions of the first wheel carrier or the second wheel carrier.

In some additional, alternative, or selectively cumulative embodiments, force-applying coupling assembly fits around both forward and rear ends of the first wheel carrier or the second wheel carrier.

In some additional, alternative, or selectively cumulative embodiments, the torque-coupling assembly is controllably disengageable.

In some additional, alternative, or selectively cumulative embodiments, the load wheel assembly is adapted for use in a fork assembly that comprises an elongate body; a load wheel module, which includes the load wheel assembly; and a fork tip.

In some additional, alternative, or selectively cumulative embodiments, the load wheel assembly is adapted for use in a fork assembly that comprises a discrete elongate body; a discrete load wheel module, which includes the load wheel assembly; a first interlocking mechanism detachably connecting the elongate body to the load wheel module; a discrete fork tip; and a second interlocking mechanism detachably connecting the load wheel module to the fork tip.

In some additional, alternative, or selectively cumulative embodiments, the load wheel assembly is adapted for use in a load wheel module that comprises a frame, wherein the load wheel assembly is operatively connected to the frame, and wherein a hydraulic actuator contained within the frame and operatively connected to the load wheel assembly to lower the load wheel hydraulically.

In some additional, alternative, or selectively cumulative embodiments, the torque-coupling assembly comprises an upper idler wheel positioned above the forward and rear load wheels, a lower idler wheel positioned beneath the forward and rear load wheels, and a force-applying coupling assembly that directly or indirectly connects the upper idler wheel and the lower idler wheel and forces (or tensions) them toward each other.

In some additional, alternative, or selectively cumulative embodiments, the idler wheel comprises or is attached to a gear wheel.

In some additional, alternative, or selectively cumulative embodiments, at least one of the forward load wheel and the rear load wheel has grooves.

In some additional, alternative, or selectively cumulative embodiments, the torque-coupling assembly comprises a belt.

In some additional, alternative, or selectively cumulative embodiments, the torque-coupling assembly comprises one or more gears.

In some additional, alternative, or selectively cumulative embodiments, the torque-coupling assembly comprises a track that forms a loop around the forward load wheel and the rear load wheel.

In some additional, alternative, or selectively cumulative embodiments, the torque-coupling assembly comprises an idler wheel having an idler wheel surface, the idler wheel surface has direct contact with the forward load wheel surface and the rear load wheel surface, and the torque-coupling assembly comprises a force-applying coupling assembly configured to elastically urge the idler wheel into contact with the forward load wheel and the rear load wheel.

In some additional, alternative, or selectively cumulative embodiments, the load wheel assembly is adapted for use in a pallet truck that comprises first and second fork assemblies, wherein each fork assembly includes a load wheel assembly and further comprises an elongate body with a body proximal end and a body distal end, wherein the body proximal end is suitable for direct or indirect attachment to a chassis; and a torque transfer assembly adapted to transfer torque between the forward and rear load wheels.

Selectively cumulative embodiments are embodiments that include any combination of multiple embodiments that are not mutually exclusive.

Additional aspects and advantages will be apparent from the following detailed description of example embodiments, which proceeds with reference to the accompanying drawings.

BRIEF DESCRIPTION OF THE DRAWINGS

FIG. 6A is a top plan view of a load wheel assembly employing an alternative embodiment of a torque-coupling assembly.

FIG. 6B is a side elevation view of the load wheel assembly of FIG. 6A with a wheel carrier strut and a portion of a wheel carrier bracket removed for clarity.

FIG. 6C is a side elevation view of an idler wheel of the torque-coupling assembly shown in FIG. 6A.

FIG. 7A is a top plan view of a load wheel assembly employing another alternative embodiment of a torque-coupling assembly.

FIG. 7B is a side elevation view of the load wheel assembly of FIG. 7A with a wheel carrier strut and a portion of a wheel carrier bracket removed for clarity.

FIG. 7C shows a side elevation view of the torsion clip of FIG. 7B in one example of a relaxed shape when the torsion clip is not yet deployed over an idler axle.

FIG. 17A illustrates a top plan view of a fork assembly, according one embodiment.

FIG. 17B illustrates a right-side elevation view of the fork assembly shown in FIG. 17A.

FIG. 17C illustrates a bottom view of the fork assembly shown in FIG. 17A.

FIG. 18A illustrates a front right bottom isometric view of a load wheel module of a fork assembly, showing an undeployed load wheel unit, according to one embodiment.

FIG. 18B illustrates a front right bottom isometric view of a load wheel module of a fork assembly, showing a deployed load wheel unit, according to one embodiment.

DETAILED DESCRIPTION OF EXAMPLE EMBODIMENTS

Figure 1A:
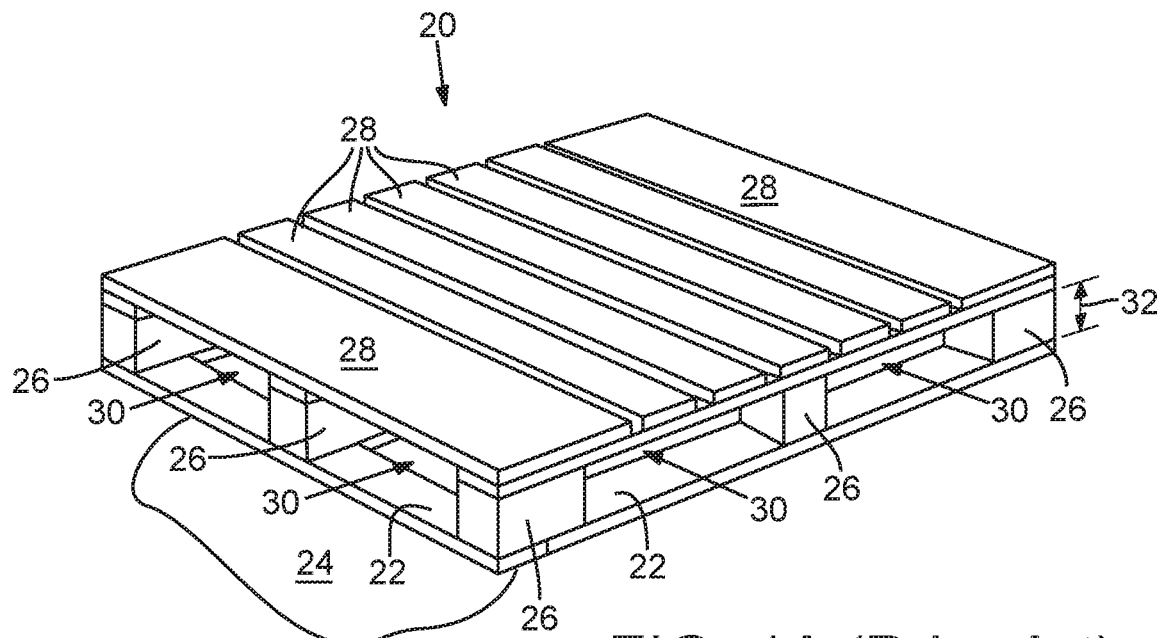
FIG. 1A is an orthogonal view of an example of a prior-art closed-bottom pallet.

Example embodiments are described below with reference to the accompanying drawings. Unless otherwise expressly stated, the sizes, positions, etc., of components, features, elements, etc., as well as any distances therebetween, in the drawings are not necessarily to scale, and may be disproportionate and/or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," "comprising," "include," "includes," "including," "has," "have," and "having," when used in this document, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another and not to imply any relative order, placement, or ranking. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc., mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," "left," "forward," "rearward," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the drawings. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings. Additionally, the drawings may include non-essential elements that are included only for the sake of thoroughness. These non-essential elements may be removed entirely or left only in outline form if drawing changes are desired to create greater clarity.

The embodiments described herein are merely examples, set forth by way of illustration only and not limitation. Those skilled in the art will recognize in light of the teachings herein that there are alternatives, variations and equivalents to the example embodiments described herein and their component parts. For example, other embodiments are readily possible, variations can be made to the embodiments described herein, and there may be equivalents to the components, parts, or steps that make up the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

FIG. 1A is an orthogonal view of an example of a closed-bottom pallet (also called a closed pallet) 20 that is commonly used in the UK, USA, and Australia. The closed pallet 20 has one or more base boards 22 that contact a supporting surface 24, such as the floor. The base boards 22 provide the foundation for spacers 26 that support one or more upper planks 28 that support a load.

Figure 1B:
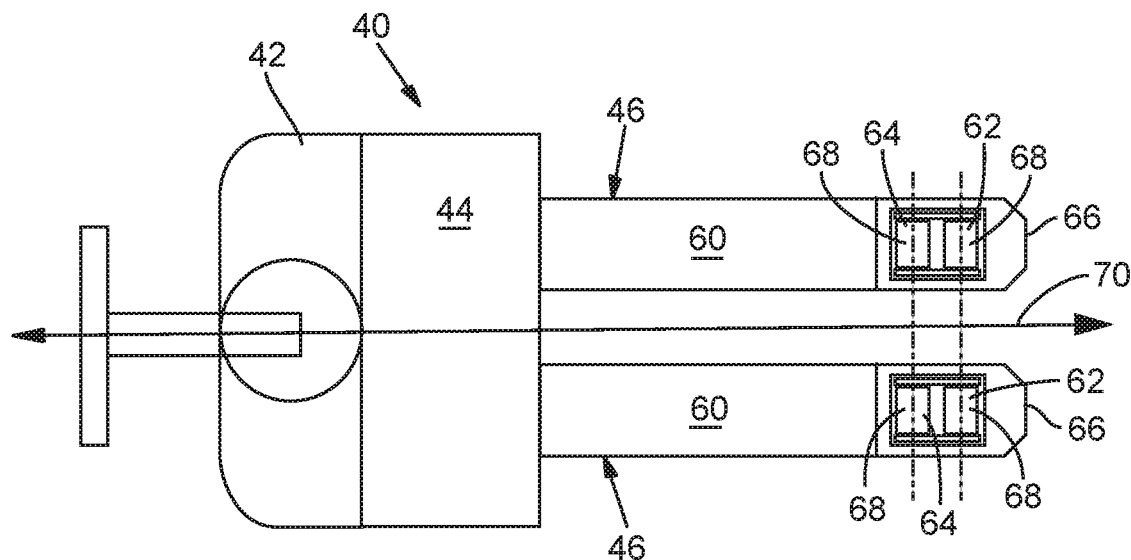
FIG. 1B is a top schematic view of a prior-art pallet truck.

FIG. 1B is a top schematic view of a prior pallet truck 40, which is an example of a forked material-handling vehicle. Pallet trucks 40, such as pedestrian pallet trucks (PPT) or rider pallet trucks (RPT), are often employed to handle pallets that are on the ground or on another horizontal surface, for example, when loading or unloading from a transport vehicle, such as a truck or shipping container. Pallet trucks 40 typically include a chassis 42 that supports or is attached to a battery box 44. The chassis 42 or the battery box 44 is connected to a pair of forks 46, each fork 46 having an elongate body 60, a forward load wheel 62, a rear load wheel 64, and a tip 66. The forward load wheel 62 and the rear load wheel 64 can be collectively referred to as load wheels 68.

Figure 1C:
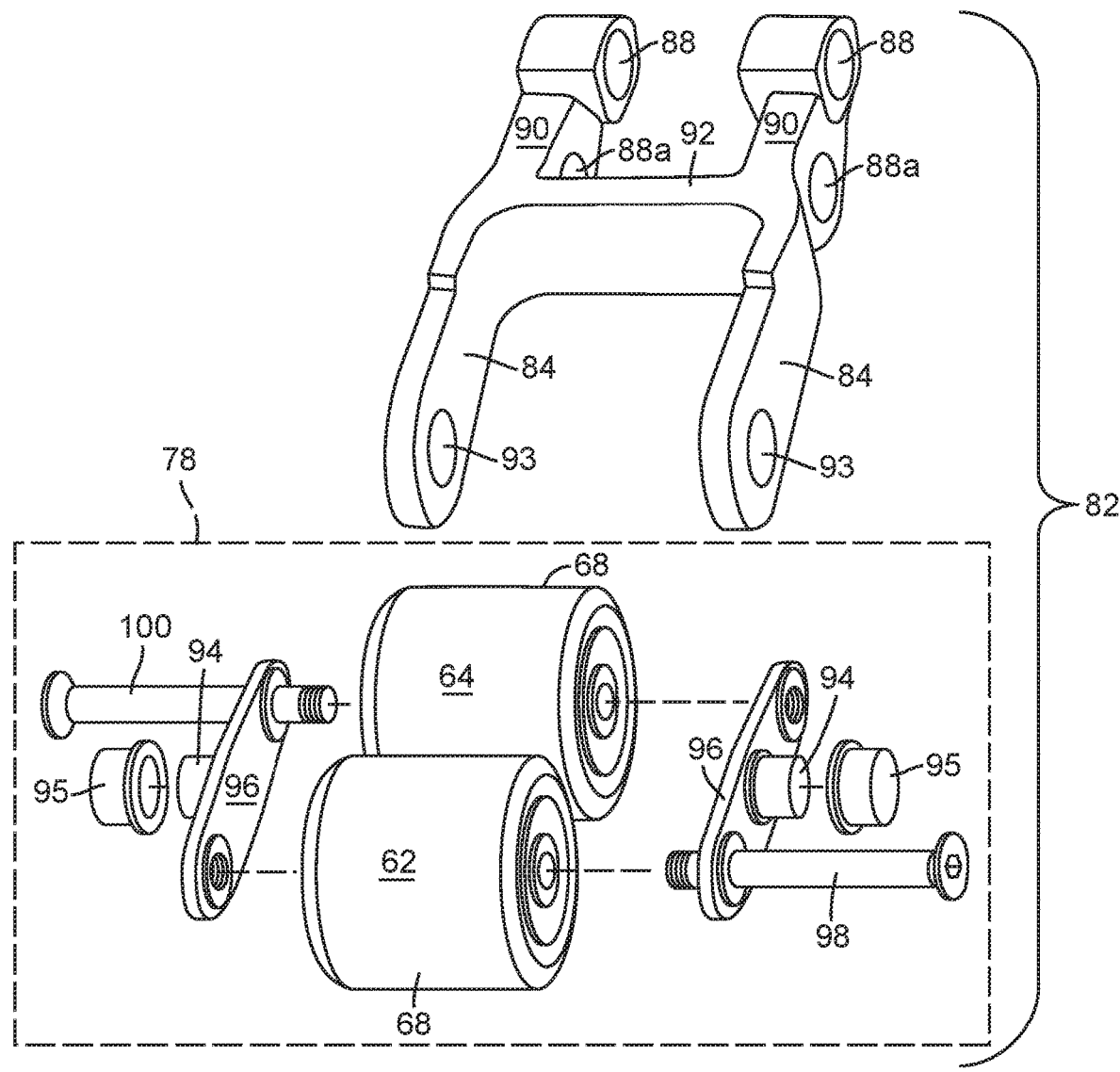
FIG. 1C is an isometric view of a load wheel unit of a prior-art pallet truck.
Figure 2A:
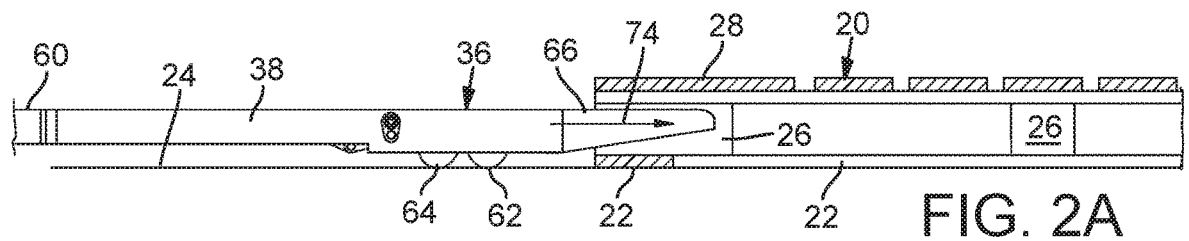
FIGS. 2A-2D are a series of side elevation views showing a progression of a fork approaching a closed-bottom pallet, encountering the closed-bottom pallet, negotiating a base board of the closed-bottom pallet, and deploying a load wheel extension mechanism to lift the closed-bottom pallet off of a supporting surface.
Figure 2B:
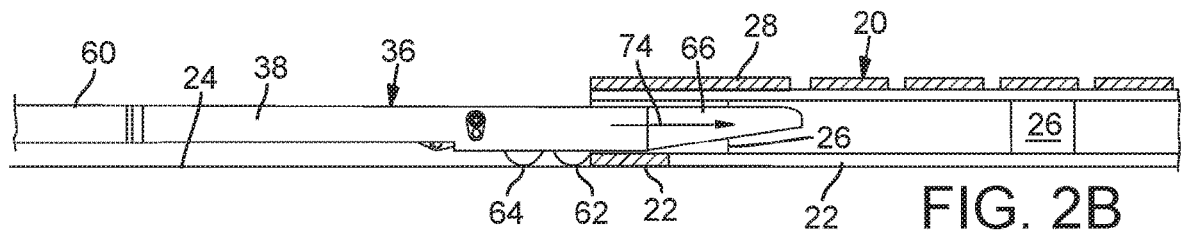
Figure 2C:
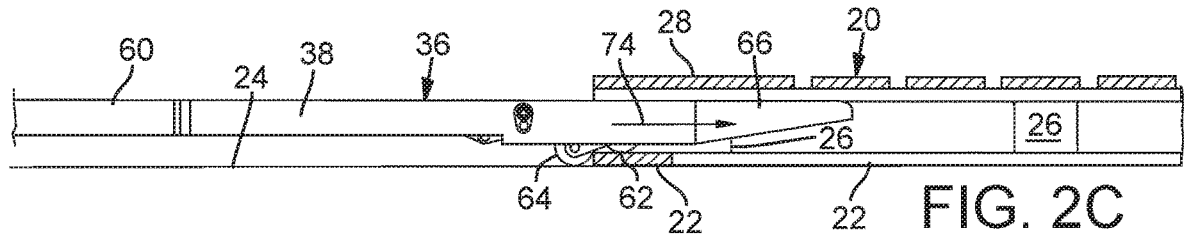
Figure 2D:
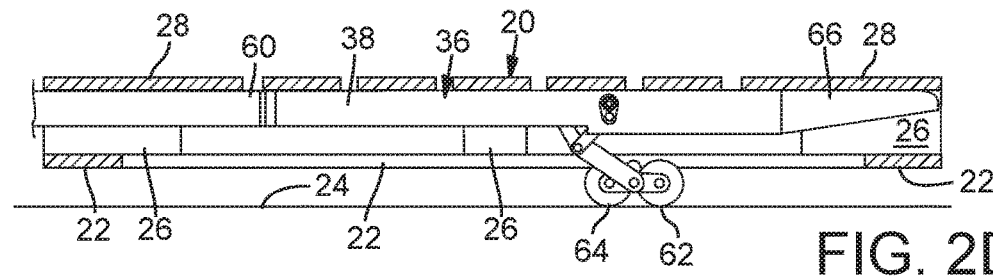

FIG. 1C is an isometric view of a load wheel unit 78 of a prior art pallet truck 40. FIGS. 2A-2D are a series of side elevation views showing a progression of a fork 46 approaching a closed-bottom pallet 20 in a forward direction 74, encountering the base board 22 of the closed-bottom pallet 20, negotiating the base board 22 of the closed-bottom pallet 20, and deploying a load wheel extension mechanism to lift the closed-bottom pallet 20 off of a supporting surface 24. With reference to FIGS. 1A-1C and 2A-2D, when engaging or disengaging closed pallets 20, the forward load wheel 62 and the rear load wheel 64 of the pallet truck 40 cross over the top of the base boards 22 of the closed pallet 20 to enter and exit pallet pockets 30. When a closed pallet 20 is empty, or has a light-weight palletized load (commonly meaning bearing a load of 25 kg or less), the forward load wheel 62 of the pallet truck 40 may lock upon contact with the closed pallet 20 and stop rotation instead of riding over the base boards 22 and into the pallet pockets 30 of the closed pallet 20. However, the rear load wheel 64 may continue to rotate so that the closed pallet 20 may be shunted or pushed horizontally across the surface 24. Similarly, the rear load wheel 64 may lock while the forward load wheel continues to roll during attempts to exit the pallet pockets 30. Such shunting is undesirable because it can damage the base board 22 and/or the surface 24 on which the closed pallet 20 sits and may move the pallet 20 to an undesired location. Also, failure to enter the pallet 20 prevents the pallet 20 from being retrieved, and failure to exit an empty pallet 20 renders the truck 40 useless with a pallet 20 trapped on the forks 46 until the pallet 20 is removed.

Figure 3:
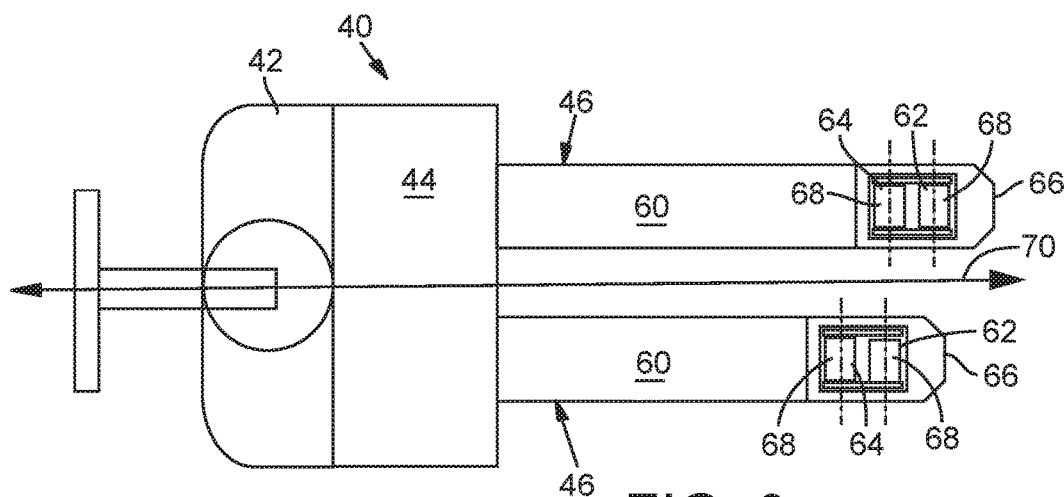
FIG. 3 is a top schematic view of a pallet truck having offset forward load wheels.

One approach that increases the success ratio of pallet engagement and disengagement involves offsetting the forward load wheels 62 of the different forks 46 along a longitudinal axis 70 of the pallet truck 40. FIG. 3 is a top schematic view of a pallet truck 40a having offset forward load wheels 62. This approach permits the forward load wheels 62 on the different forks 46 to encounter base boards 22 sequentially, rather than simultaneously as would happen with a straight-in approach using non-offset forward load wheels 62. Such sequential engagement between the forward load wheels 62 exerts less horizontal force on the base boards 22 compared to both forward load wheels 62 encountering the base board 22 simultaneously. This approach is disclosed in detail in U.S. Provisional Patent Application No. 62/609,235, entitled "Offset Load Rollers for a Pallet Truck", which is incorporated herein by reference. In one example, the tips 66 of the two forks 46 may be offset and the forward load wheels 62 may be about the same distances from distal tip ends 72 of the tips 66. In another example, the forks 46 may have the same length (or different lengths) and the forward load wheels 62 may have different distances from the from distal tip ends 72 of the tips 66. Despite these improvements, attempts at entry into, or exit from, pallet pockets 30 of closed pallets 20 that are empty, or have a light-weight palletized load, are only about 80% successful.

This disclosure teaches additional or alternative means to increase the entry and exit potential with respect to pallet pockets 30 of closed pallets 20 that are empty or have a light-weight palletized load. For example, torque between the rear load wheel 64 and the forward load wheel 62 can be coupled so that if either of the rear load wheel 64 or the forward load wheel 62 meet resistance at a base board 22, then rotation of the other of the load wheels 68 will increase the ability of the inhibited load wheel 68 to move over the base board 22. In particular, if the forward load wheel 62 meets resistance when encountering the base board 22 while attempting to enter a pocket 30, then the continuous rotation of the rear load wheel 64 if a forward direction (caused by friction against the ground due to movement of the pallet truck 40) will cause rotation of the forward load wheel 62 if the torque is coupled between the load wheels 68. Similarly, if the rear load wheel 64 meets resistance when encountering a base board 22 while attempting to exit a pocket 30, then the continuous rotation of the forward load wheel 62 (in a reverse direction) will cause rotation of the rear load wheel 64 if the torque is coupled between the load wheels 68.

Figure 4A:
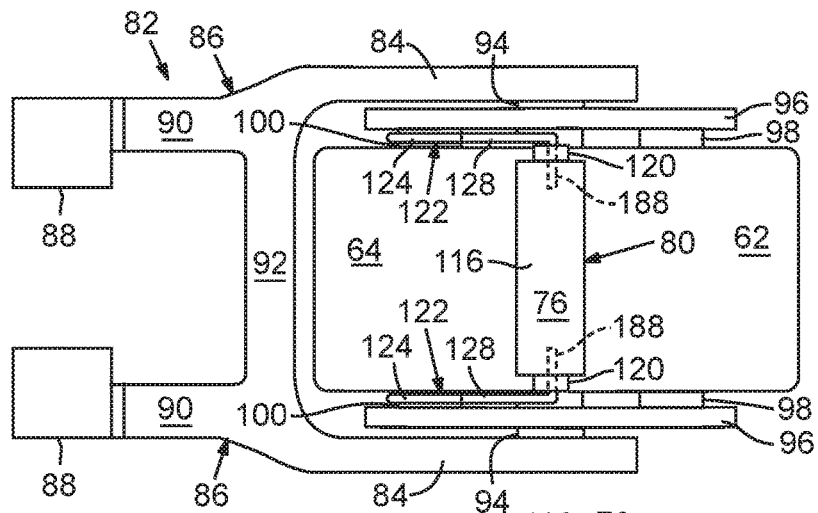
FIG. 4A is a top plan view of a load wheel assembly employing an embodiment of a torque-coupling assembly.
Figure 4B:
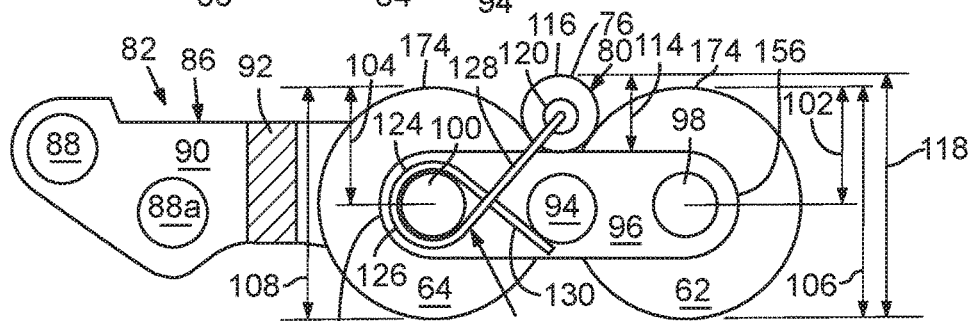
FIG. 4B is a side elevation view of the load wheel assembly of FIG. 4A with a wheel carrier strut and a portion of a wheel carrier bracket removed for clarity.

FIG. 4A is a top plan view of a load wheel assembly 82 employing an embodiment of a torque-coupling assembly 80, and FIG. 4B is a side elevation view of the load wheel assembly 82 of FIG. 4A with one of two wheel carrier struts 84 and a portion of a wheel-carrier bracket 86 removed for clarity. A torque coupler or torque-coupling assembly 80 can be implemented in many ways. One will appreciate that a torque-coupling assembly 80 can be implemented as any torque coupler known in the art, as well as any of the torque-coupling means for coupling torque described herein.

With reference to FIGS. 4A and 4B, the load wheel assembly 82 may include one or more wheel-carrier brackets 86 that operatively connect one or more of the load wheels 68 to the fork 46. The wheel-carrier bracket 86 may include one or more fork attachment pivot holes 88 or 88a that can be used to attach the wheel-carrier bracket 86 to the fork 46. The fork attachment pivot holes 88 may be positioned toward a proximal end of the wheel-carrier bracket 86 on separate bracket arms 90 connected by a bracket cross bar 92. The wheel-carrier struts 84 may extend forward from the bracket cross bar 92 on separate sides of the load wheels 68. In some embodiments, each wheel-carrier strut 84 may include an axle mount hole 93 (or other mounting means) adapted to receive a carrier axle 94 (with or without bushings 95, see FIG. 1C) of a wheel carrier 96 to facilitate rotatable connection between the wheel-carrier struts 84 and the wheel carriers 96. The wheel carriers 96 are also connected to a forward axle 98 and a rear axle 100 to permit rotation of the respective forward load wheel 62 and the rear load wheel 64. For purposes of discussion, the wheel carrier 96, the forward load wheel 62, the rear load wheel 64, the forward axle 98, the rear axle 100, and the torque-coupling assembly 80 can be grouped together as a load wheel unit 78.

Forks 46 tend to have a limited height dimension that is typically shorter than a spacer height 32 of the closed-bottom pallet 20 so that the forks 46 and their respective load wheel assemblies 82 can easily fit between the base boards 22 and the upper planks 28. The spacer height 32 may be slightly shorter than a pallet gap height 34 between the base boards 22 and the upper planks 28. Accordingly, the forward load wheel 62 has a forward wheel radius 102 that may be less than half the spacer height 32 or less than half the pallet gap height 34. Similarly, the rear load wheel 64 has a rear wheel radius 104 that may be less than half the spacer height 32 or less than half the pallet gap height 34. Additionally, the forward load wheel 62 has a forward wheel height 106 above the supporting surface 24 that may be shorter than the spacer height 32 or the pallet gap height 34. Similarly, the rear load wheel 64 has a rear wheel height 108 above the supporting surface 24 that may be shorter than the spacer height 32 or the pallet gap height 34.

One will appreciate that the operative connection of the load wheels 68 to the fork can be implemented in a variety of alternative ways. For example, FIGS. 17A-17C and 17A-17C show one embodiment for connecting the load wheels 68 to the fork and are described later.

Neither the forward load wheel 62 nor the rear load wheel 64 is connected directly or indirectly to a motor, i.e., the load wheels 68 are non-motorized or unmotorized. More specifically, there is no mechanical linkage from a drive motor that causes rotation of the load wheels 68. Moreover, rotation of the load wheels 68 is caused by movement of the pallet truck 40 and contact of at least the forward load wheel 62 or the rear load wheel 64 with the supporting surface 24.

The torque-coupling assembly 80 shown in FIGS. 4A and 4B employs an idler wheel 116 (also called a coupling wheel) that may rotate about an idler axle 120 and that has an idler wheel surface 76 (also called a coupling wheel surface) that directly contacts both the forward load wheel 62 and the rear load wheel 64. The idler wheel 116 may utilize a tire that can have a pneumatic or a solid core, such as used in any conventional tire. The surface 76 of the idler wheel 116 and/or the core of the idler wheel 116 can be made from the same or different materials. In some embodiments, the surface 76 and/or the core of the idler wheel 116 can be made from a polymer, such as polyurethane. In other embodiments, the surface 76 and/or the core of the idler wheel 116 can be made from a metal, such as aluminum or steel. In some embodiments, the surface 76 of the idler wheel 116 may employ a non-smooth texture.

The idler wheel 116 may have a small idler wheel diameter 114 so as to provide some clearance with an upper wall interior surface of the fork 46. In particular, the idler wheel diameter 114 may be shorter than or equal to the forward wheel radius 102 and/or the rear wheel radius 104. Moreover, the idler wheel 116 has an idler wheel height 118 above the supporting surface 24 that may be higher than or equal to the forward wheel height 106 or the rear wheel height 108, or the idler wheel height 118 may be shorter than or equal to the forward wheel height 106 or the rear wheel height 108. In some embodiments, the idler wheel height 118 may be within 5% of the forward wheel height 106 or the rear wheel height 108.

The amount of torque transferred by the torque-coupling assembly 80 is highly variable depending on materials used, surface finishes, and contamination from the environment. A suitable range for torque transfer may be from about 1 to 40 Newton meters (Nm) or may be from about 2 to 20 Newton meters (Nm). Generally, the amount of torque transferred by the torque-coupling assembly 80 is greater than or equal to 2 Nm. One will appreciate, however, that the amount torque transferred may be less than 2 Nm. One will also appreciate that the amount torque transferred may be greater than 40 Nm.

This torque-coupling assembly 80 also employs one or more or force-applying coupling assemblies or force-applying couplers 122. A force-applying coupler or force-applying coupling assembly 122 can be implemented in many ways. One will appreciate that a force-applying coupling assembly 122 can be implemented as any force-applying coupling assembly known in the art, as well as any of the force-applying coupling means for coupling force described herein. In many embodiments, such as any of the force-applying coupling assemblies 122 (with or without an additional letter designation), the force-applying coupling assembly 122 may fall into the subcategory of a resilient force-applying coupling assembly (or resilient force-applying coupler).

The force-applying coupler 122 shown in FIGS. 4A and 4B also constitutes a resilient force-applying coupler 122, employing a torsion spring 124. The torsion spring 124 can have a single loop 126 or can have a helical component. The torsion spring 124 may include an idler arm 128 that is directly or indirectly connected to the idler wheel 116 such as to the idler axle 120. The torsion spring 124 may also include a carrier arm 130 that is directly or indirectly connected to the wheel carrier 96, such to its carrier axle 94. In some embodiments, the idler arms 128 may have auxiliary projections 188 that insert into the idler axle 120 of the idler wheel 116 or that function as the axle 120 of the idler wheel 116. In some embodiments, the idler arms 128 may slide through an axle slot 138 in an idler axle 120b of an idler wheel 116b as shown in FIG. 6C. The slot 138 may prevent rotation of the idler axle 120 in embodiments in which the idler wheel 116 constitutes a roller with bearings over the idler axle 120.

In the embodiment shown in FIGS. 4A and 4B, the loop 126 of the torsion spring 124 is positioned around the rear axle 100 and the idler arm 128 crosses carrier arm 130 to provide force (such as tension) to hold the idler wheel 116 against the forward load wheel 62 and the rear load wheel 64. One will appreciate however that the loop 126 of the torsion spring 124 could be positioned about the forward axle 98 instead of the rear axle 100. Or, the loops of two torsion springs 124 could be positioned about both the forward axle 98 and the rear axle 100 to provide additional force (and/or a backup coupling) if desired. If torsion springs 124 are positioned on both sides (left and right) of the load wheels 62 and 64, then the loops 126 of both torsion springs 124 may be positioned about the same axle. In some embodiments, however, the loops 126 may be positioned about different axles. One will also appreciate that the force-applying coupling assembly 122, and more specifically the loops 126 of the torsion springs 124, can alternatively be positioned outside the wheel carrier 96, i.e. between the wheel carrier 96 and the strut 84, on an extension of the forward axle 98 or the rear axle 100. Such an axle extension could include a larger diameter rim to prevent the loop 126 from coming off the axle extension.

One advantage of employing a force-applying coupler 122 is that it can be adapted to apply enough force to couple the torque between the forward load wheel 62 and the rear load wheel 64 (e.g., ensure that there is sufficient friction between the forward load wheel 62 and the rear load wheel 64), and at the same time not create unnecessary drag on the movement of the forward load wheel 62 and the rear load wheel 64. Suitable force provided by the cumulative force-applying couplers 122 acting on the forward load wheel 62 and the rear load wheel 64 may be in the range of about 5 to 315 Newtons, or the force may be in the range of about 5 to 110 Newtons. Generally, the cumulative coupling force may be greater than or equal to about 5 Newtons. One will appreciate that the cumulative coupling force may be less than 5 Newtons. One will also appreciate that the cumulative coupling force may be greater than 315 Newtons. Additionally, one will appreciate that this cumulative force can be divided by the total number of springs in the total number of force-applying couplers 122 that are employed in any given torque-coupling assembly 80 to determine a desirable amount of force per force-applying coupler 122.

Figure 5A:
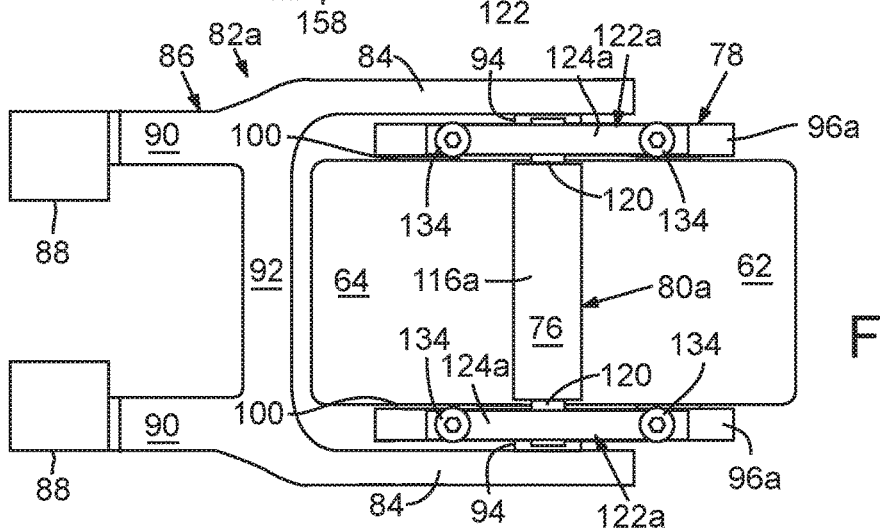
FIG. 5A is a top plan view of a load wheel assembly employing an alternative embodiment of a torque-coupling assembly.
Figure 5C:
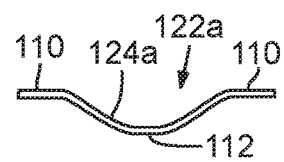
FIG. 5C shows a side elevation view of a leaf spring of FIG. 5B in one example of a relaxed shape when the leaf spring is not yet deployed over an idler axle and connected to a wheel carrier.
Figure 5B:
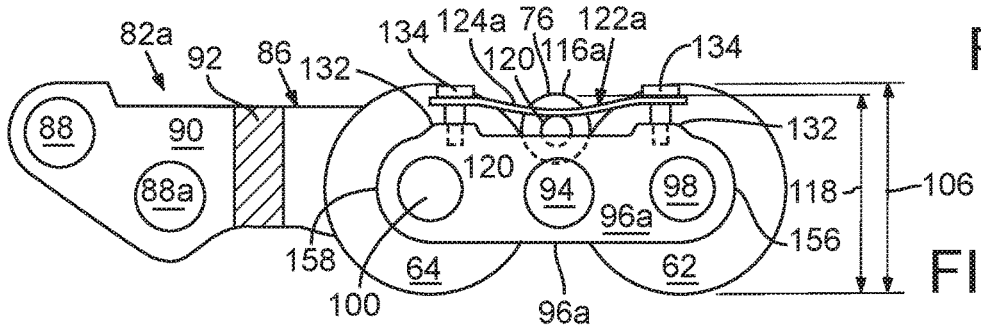
FIG. 5B is a side elevation view of the load wheel assembly of FIG. 5A with a wheel carrier strut and a portion of a wheel carrier bracket removed for clarity.

One will also appreciate that the force coupling (or resilient force coupling) of the idler wheel 116 to the load wheels 68 can be implemented in a variety of other ways. For example, FIG. 5A is a top plan view of a load wheel assembly 82a employing an alternative embodiment of a torque-coupling assembly 80a, and FIG. 5B is a side elevation view of the load wheel assembly 82a of FIG. 4A with one of the wheel-carrier struts 84 and a portion of the wheel-carrier bracket 86 removed for clarity. The alternative torque-coupling assembly 80a may employ an alternative force-applying coupler (or resilient force applying coupler) 122a that includes an alternative to the torsion spring 124 in the form of a spring plate or leaf spring 124a. The leaf spring 124a may include spring end tabs 110 that extend from a central curved portion 112 of the leaf spring 124a. The leaf spring 124a may be connected to optional bosses or ridges 132 of an alternative wheel carrier 96a by any suitable attachment means such as carrier bolts (or screws) 134. The idler wheel 116 may have a smaller idler wheel height 118 adapted to accommodate a downward curve of the leaf spring 124a that can provide force against the idler axle 120 so that the leaf spring 124a urges the idler wheel 116 against the forward load wheel 62 and the rear load wheel 64. FIG. 5C shows a side elevation view of a leaf spring 124a of FIG. 5B in one example of a relaxed shape when the leaf spring 124a is not yet deployed over the idler axle 120 and connected to the wheel carrier 96.

FIG. 6A is a top plan view of a load wheel assembly 82b employing another alternative embodiment of a torque-coupling assembly 80b, FIG. 6B is a side elevation view of the load wheel assembly 82b of FIG. 6A with a wheel carrier strut 84 and a portion of a wheel carrier bracket 86 removed for clarity, and FIG. 6C is a side elevation view of an idler wheel 116b of the torque-coupling assembly 80b. The alternative torque-coupling assembly 80b may employ an alternative force-applying coupler (or resilient force-applying coupler) 122b that includes an alternative spring 124b in the form of an inverted leaf spring or spring plate. The spring 124b may be held by spring brackets 136 that form pockets 137 on an alternative wheel carrier 96b at a position above or near the forward axle 98 and the rear axle 100, or the spring 124b may be connected to the wheel carrier 96b by any suitable attachment means such as carrier bolts (or screws).

The spring 124b may slide through an axle slot 138 in an idler axle 120b of the idler wheel 116b torque-coupling assembly 80b as shown in FIG. 6C, to provide force against the idler axle 120b so that the leaf spring urges the idler wheel 116b against the forward load wheel 62 and the rear load wheel 64. As previously noted, the slot 138 may prevent rotation of the idler axle 120b in embodiments in which the idler wheel 116b constitutes a roller with bearings over the idler axle 120b. Alternatively, the spring 124b may be positioned (not shown) above the idler axle 120b to provide downward force against the idler axle 120b so that the leaf spring urges the idler wheel 116b against the forward load wheel 62 and the rear load wheel 64. The idler wheel 116b may have an idler wheel height 118b adapted to accommodate the curve of the leaf spring (or the curve of the leaf spring may be adapted to idler wheel height 118b) to provide force against the idler axle 120b so that the leaf spring urges the idler wheel 116b against the forward load wheel 62 and the rear load wheel 64. Although not shown, bolts 134, screws, pins, or other fasteners can be employed to secure the spring 124b to the spring brackets 136 from above the spring brackets 136 into holes or slots toward the ends of the springs 124b.

FIG. 7A is a top plan view of a load wheel assembly 82c employing another alternative embodiment of a torque-coupling assembly 80c, and FIG. 7B is a side elevation view of the load wheel assembly 82c of FIG. 7A with a wheel carrier strut 84 and a portion of a wheel carrier bracket 86 removed for clarity. The alternative torque-coupling assembly 80c may employ an alternative force-applying coupler (or resilient force-applying coupler) 122c that includes a spring clip 124c generally in the form of a "U"-shaped clip, having a lower segment 140, a bend 142, and an upper segment 144. The lower segment 140 of the spring clip 124c may be a wire or a strip. The lower segment 140 of the spring clip 124c may be connected to a hole (not shown) on the top 172 of the wheel carrier 96c at a position above or near the forward axle 98 and the rear axle 100 by any suitable attachment means such as one or more carrier bolts 134 (or screws).

The upper segment 144 of the spring clip 124c may constitute a pre-loaded spring that is positioned (as shown in FIG. 7A) above the idler axle 120 to provide downward force against the idler axle 120 so that the spring clip 124c urges the idler wheel 116 against the forward load wheel 62 and the rear load wheel 64. Alternatively, the upper segment 144 may slide through an axle slot (not shown, but such as in FIG. 6C) in an idler axle 120 of the idler wheel 116 of the torque-coupling assembly 80c to provide force against the idler axle 120 so that the spring clip 124c urges the idler wheel 116 against the forward load wheel 62 and the rear load wheel 64. As noted previously, such a slot 138 may prevent rotation of the idler axle 120 in embodiments in which the idler wheel 116 constitutes a roller with bearings over the idler axle 120.

The idler wheel 116 may have an idler wheel height 118c adapted to accommodate the curve and upper segment of the spring clip 124c (or the curve of the spring clip 124c may be adapted to idler wheel height 118c) to provide force against the idler axle 120 so that the spring clip 124c urges the idler wheel 116 against the forward load wheel 62 and the rear load wheel 64. One will appreciate that the bolt 134 may be positioned closer to either the forward axle 98 or the rear axle 100 with the bend 142 positioned closer to the opposite axle. When the spring clips 124c are positioned at both sides of the idler wheel 120, the bends 142 can be facing the same direction or different directions. FIG. 7C shows a side elevation view of the spring clip 124c of FIG. 7B in one example of a relaxed shape when the spring clip 124c is not yet deployed about the ends 156 and 158 of the wheel carrier 96.

Figure 8A:
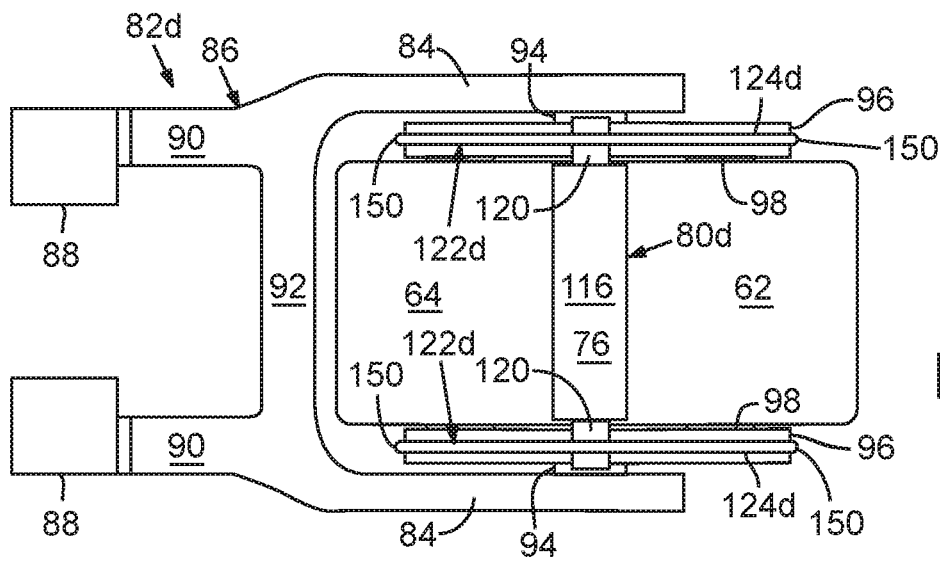
FIG. 8A is a top plan view of a load wheel assembly employing another alternative embodiment of a torque-coupling assembly.
Figure 8B:
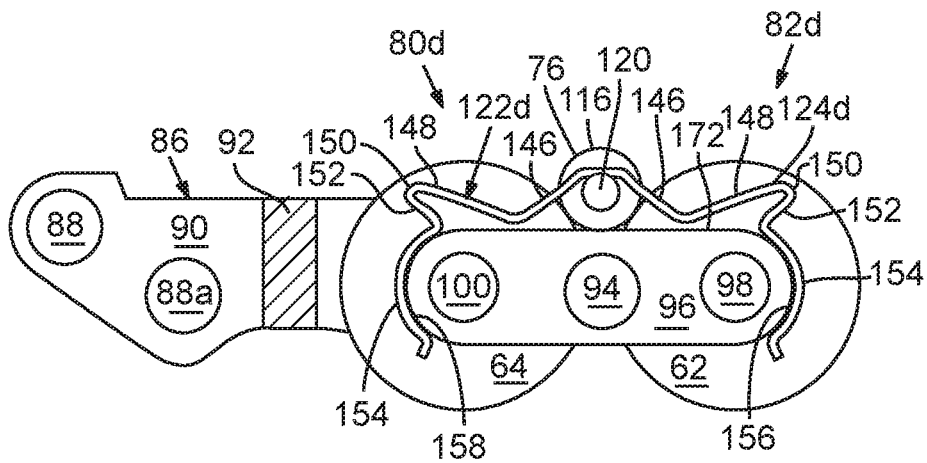
FIG. 8B is a side elevation view of the load wheel assembly of FIG. 8A with a wheel carrier strut and a portion of a wheel carrier bracket removed for clarity.

FIG. 8A is a top plan view of a load wheel assembly 82d employing another alternative embodiment of a torque-coupling assembly 80d, and FIG. 8B is a side elevation view of the load wheel assembly 82d of FIG. 8A with a wheel carrier strut 84 and a portion of a wheel carrier bracket 86 removed for clarity. The alternative torque-coupling assembly 80d may employ an alternative force-applying coupler (or resilient force-applying coupler) 122d that includes a tension clip 124d generally in the form of a "frog"-shaped clip, having a rounded upper back segment 146, two upper thigh segments 148, and a knee bend 150, two lower leg segments 152, and two foot segments 154.

The rounded upper back segment 146 of the tension clip 124d may be positioned (as shown in FIG. 8A) above the idler axle 120 to provide downward tension against the idler axle 120 so that the tension clip 124d urges the idler wheel 116c against the forward load wheel 62 and the rear load wheel 64. Alternatively, the rounded upper back segment 146 may slide through an axle slot (not shown, but such as shown in FIG. 6C) in an idler axle 120 of the idler wheel 116 of the torque-coupling assembly 80d to provide tension against the idler axle 120 so that the tension clip 124d urges the idler wheel 116 against the forward load wheel 62 and the rear load wheel 64. As noted previously, such a slot 138 may prevent rotation of the idler axle 120 in embodiments in which the idler wheel 116 constitutes a roller with bearings over the idler axle 120. The upper back segment may be flat instead of rounded and may have a length that is longer than the diameter of the idler axle 120 to allow some float of the idler wheel 116 in connection with its contact to the forward load wheel 62 and the rear load wheel 64.

Figure 8C:
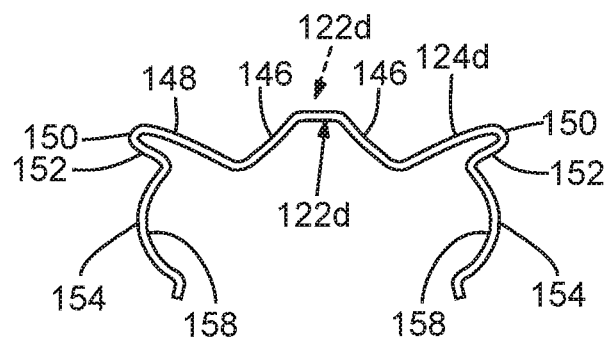
FIG. 8C shows a side elevation view of the torsion clip of FIG. 8B in one example of a relaxed shape when the torsion clip is not yet deployed about the ends of the wheel carrier.

The upper back segment 146 may adjoin an upper thigh segment 148 on each side that each reach an outward knee bend 150 that may be above and near the forward end 156 and the rear end 158 of the wheel carrier 96. From the knee bends 150, lower leg segments 152 project toward the wheel carrier 96 and are attached to foot segments 154 that at least partly wrap around and tensionally engage the ends 156 and 158. The tension clip 124d can be slipped onto the wheel carrier 96 without any additional fastener; however, the foot segments 154 or other parts of the tension clip 124d could be connected to the wheel carrier 96 by bolts or other fasteners. FIG. 8C shows a side elevation view of the tension clip 124d of FIG. 8B in one example of a relaxed shape when the tension clip 124d is not yet deployed about the ends 156 and 158 of the wheel carrier 96.

Figure 9A:
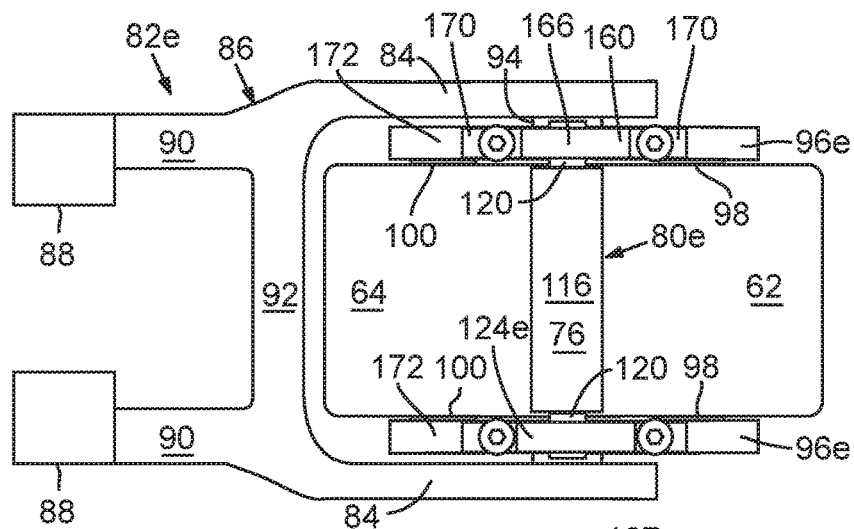
FIG. 9A is a top plan view of a load wheel assembly employing another alternative embodiment of a torque-coupling assembly.
Figure 9B:
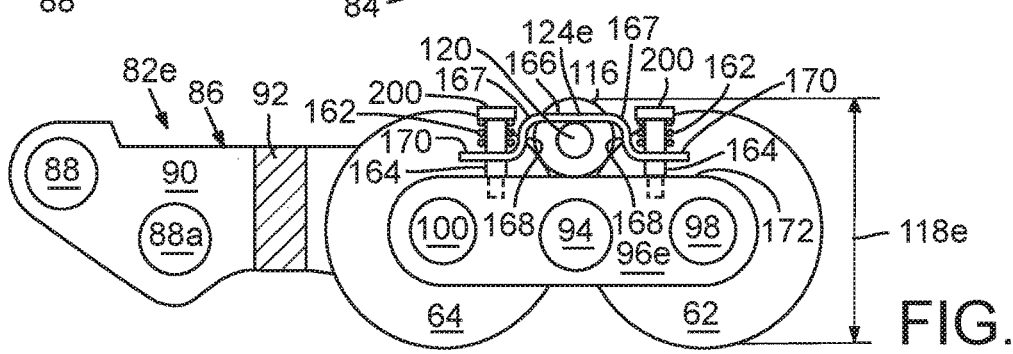
FIG. 9B is a side elevation view of the load wheel assembly of FIG. 9A with a wheel carrier strut and a portion of a wheel carrier bracket removed for clarity.

FIG. 9A is a top plan view of a load wheel assembly 82e employing another alternative embodiment of a torque-coupling assembly 80e, and FIG. 9B is a side elevation view of the load wheel assembly 82e of FIG. 9A with a wheel carrier strut 84 and a portion of a wheel carrier bracket 86 removed for clarity. The alternative torque-coupling assembly 80e may employ an alternative force-applying coupler (or resilient force-applying coupler) 122e that includes a tension plate 160, compression springs 162 and shoulder bolts 164. The tension plate 160 may have a straight upper back segment 166 between two bends 167 for vertical strut segments 168, which may terminate in plate tabs 170 that may be parallel (as shown) or angled (not shown) with respect to the top of an alternative wheel carrier 96e. The shoulder bolts 164 may extend through slots or holes (not shown) in the plate tabs 170 and be connected by a threaded portion (not shown) to threaded holes (not shown) in a surface at the top 172 of the wheel carrier 96e. The compression springs 162 may be positioned around shanks of the shoulder bolts 164 between bolt heads 200 and the plate tabs 170 to press the plate tabs toward the top 172 of the wheel carrier 96e. The pressure of the compression springs 162 against the plate tabs 170 causes the tension plate 160 against the idler axle 120, which causes the idler wheel 116 to press against the forward load wheel 62 and the rear load wheel 64. One or more of the length of the shoulder bolts 164, the strength of the compression springs 162, the diameter 114 of the idler wheel 116, and the diameter of the idler axle 120 can be adjusted to determine the idler wheel height 118e.

In an alternative embodiment, the upper back segment 166 may slide through an axle slot (not shown, but such as shown in FIG. 6C) in an idler axle 120 of the idler wheel 116 of the torque-coupling assembly 80e to provide tension against the idler axle 120 so that the force-applying coupler 122e urges the idler wheel 116 against the forward load wheel 62 and the rear load wheel 64. As noted previously, such a slot 138 may prevent rotation of the idler axle 120 in embodiments in which the idler wheel 116 constitutes a roller with bearings over the idler axle 120.

Figure 10A:
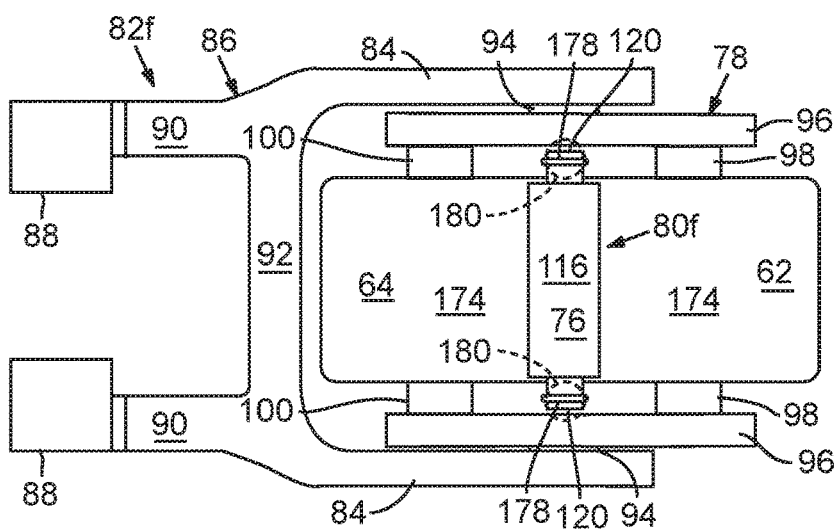
FIG. 10A is a top plan view of a load wheel assembly employing another alternative embodiment of a torque-coupling assembly.
Figure 10B:
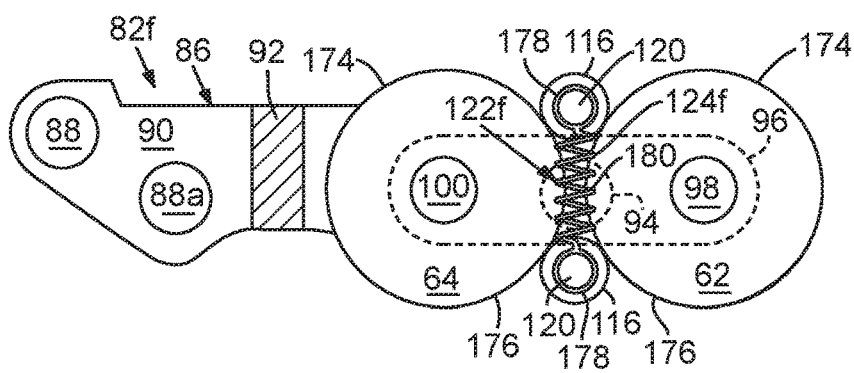
FIG. 10B is a side elevation view of the load wheel assembly of FIG. 10A with a wheel carrier strut and a portion of a wheel carrier bracket removed for clarity.

FIG. 10A is a top plan view of a load wheel assembly 82f employing another alternative embodiment of a torque-coupling assembly 80f, and FIG. 10B is a side elevation view of the load wheel assembly 82f of FIG. 10A with a wheel carrier strut 84 and a portion of a wheel carrier bracket 86 removed for clarity. The alternative torque-coupling assembly 80f employs both top and bottom idler wheels 116 that may be identical or different. Differences might include one or more of idler wheel diameter 114, idler axle diameter, and idler wheel surface textures, and idler wheel compositions, etc. One will appreciate that the torque-coupling assembly 80f is adapted so that the bottom of the bottom idler wheel 116 is at or above the bottom of the forward load wheel 62 and the rear load wheel 64. In many embodiments, the idler wheel diameter 114 and/or the spacing between the forward load wheel 62 and the rear load wheel 64 can be adjusted to determine the height of the bottom of the bottom idler wheel 116 from the supporting surface 24. The spacing might be partly controlled by the strength of an alternative force-applying coupler (or resilient force-applying coupler) 122f.

The alternative force-applying coupler 122f of the alternative torque-coupling assembly 80f may employ a tension spring 124f that tensions both the top and bottom idler wheels 116 against the upper surfaces 174 and lower surfaces 176 of the load wheels 62 and 64. The tension spring 124f may include axle loops 178 that partly or completely circle the idler axles 120 of the top and bottom idler wheels 116. The tension spring 124f also includes a spring section 180 that connects the axle loops 178 to tension the idler axles 120 of the top and bottom idler wheels 116 toward each other. This tension urges the top and bottom idler wheels 116 to contact the respective upper surfaces 174 and lower surfaces 176 of the load wheels 62 and 64 and couple the torque of the forward load wheel 62 and the rear load wheel 64. One or more of the strength of the spring section 180, the diameter 114 of the idler wheel 116, and the diameter of the idler axle 120 can be adjusted to determine the relative elevation of the idler wheel surfaces with respect to the surfaces of the forward load wheel 62 and the rear load wheel 64.

Figure 11A:
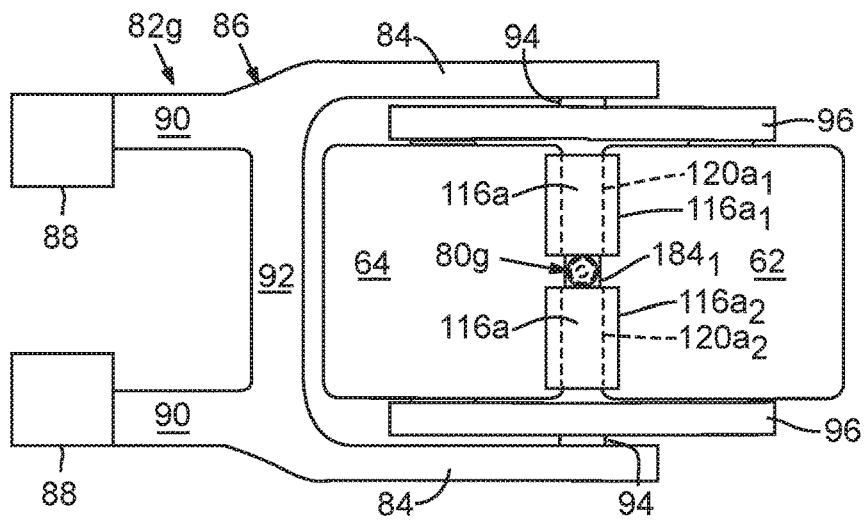
FIG. 11A is a top plan view of a load wheel assembly employing another alternative embodiment of a torque-coupling assembly.
Figure 11B:
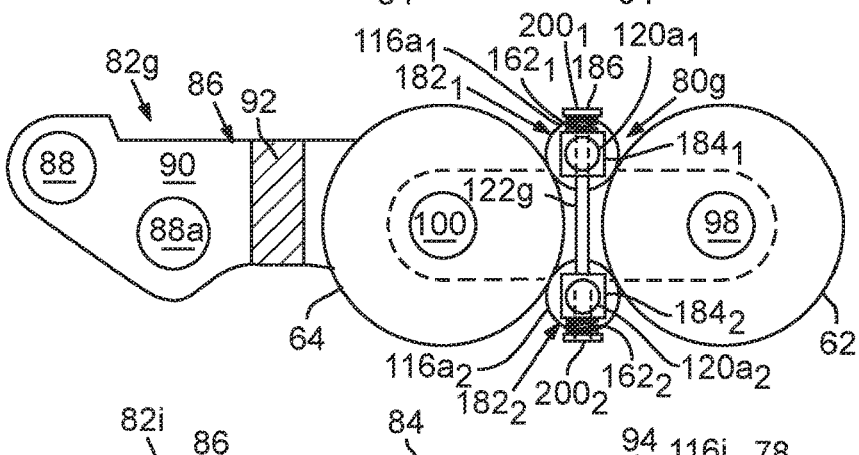
FIG. 11B is a side elevation view of the load wheel assembly of FIG. 11A with a wheel carrier strut and a portion of a wheel carrier bracket removed for clarity.

FIG. 11A is a top plan view of a load wheel assembly 82g employing another alternative embodiment of a torque-coupling assembly 80g, and FIG. 11B is a side elevation view of the load wheel assembly 82g of FIG. 11A with a wheel carrier strut 84 and a portion of a wheel carrier bracket 86 removed for clarity. The alternative torque-coupling assembly 80g may employs a pair of top and bottom idler wheels assemblies 182 that may be identical or different. Differences might include one or more of idler wheel width, idler wheel diameter 114, idler axle diameter, and idler wheel surface textures, etc.

Each idler wheel assembly 182 includes multiple idler wheels 116a, such as two idler wheels 116a, connected by a central axle block 184. A top idler wheel assembly 182₁ of the alternative torque-coupling assembly 80g might include idler wheels 116$a_1$ and 116$a_2$ having respective idler axles 120$a_1$ and 120$a_2$ that are connected by a central axle block 184₁, and a bottom idler wheel assembly 182₂ of the alternative torque-coupling assembly 80g might include a first bottom idler wheel (not shown) and a second bottom idler wheel 116$b_2$ having a respective first bottom idler axle (not shown) and a second bottom axle 120$a_2$ that are connected by a central axle block 184₂.

An alternative force-applying coupler (or resilient force-applying coupler) 122g of the alternative torque-coupling assembly 80g may employ a tension bolt 186 with top and bottom compressions springs 162₁ and 162₂ (collectively compression springs 162). The tension bolt 186 extends between the forward load wheel 62 and the rear load wheel 64 and through the central axle blocks 184₁ and 184₂. The compression springs 162 may be positioned around the shank of the tension bolt 186 between bolt heads 200₁ and 200₂ and the respective proximal surfaces of the central axle blocks 184₁ and 184₂ to press them toward each other.

The pressure of the compression springs 162 against the central axle blocks 184₁ urges the idler axles 120$a_2$ and 120$b_2$ toward each other (and idler axle 120$a_1$ toward the other bottom idler axle (not shown)), which causes the idler wheel 116$a_2$ (and idler wheel 116$a_1$) to press against the upper surfaces 174 of the forward load wheel 62 and the rear load wheel 64 and causes the idler wheel 116$b_2$ (and the other lower idler wheel (not shown)) to press against the lower surfaces 176 of the forward load wheel 62 and the rear load wheel 64, thereby coupling the torque of the forward load wheel 62 and the rear load wheel 64. One or more of the strength of the compression springs 162, the diameter 114 of the idler wheels 116, and the diameter of the idler axles 120 can be adjusted to determine the relative elevation of the top and bottom idler wheel surfaces with respect to the respective top and bottom surfaces of the forward load wheel 62 and the rear load wheel 64. One will appreciate that the torque-coupling assembly 80g can be adapted so that the bottom of the bottom idler wheel 116$a_2$ is at or above the bottom of the forward load wheel 62 and the rear load wheel 64.

Figure 12A:
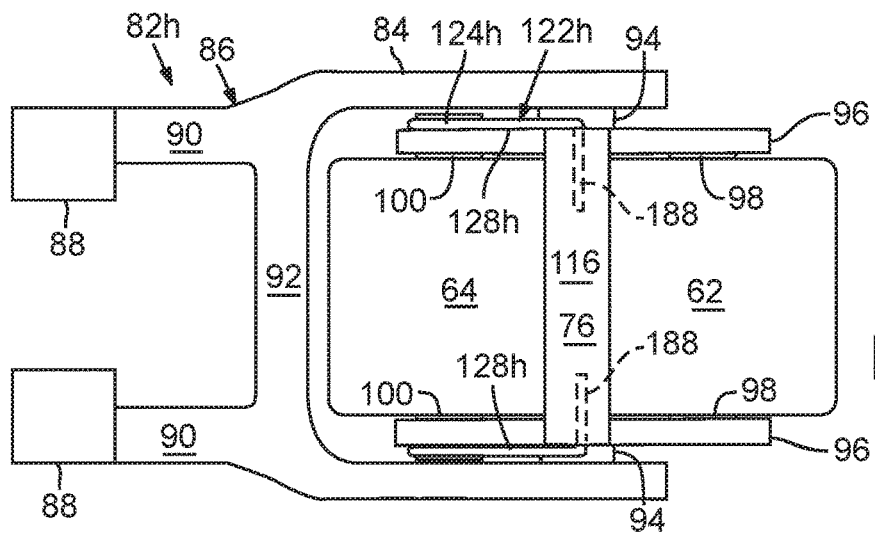
FIG. 12A is a top plan view of a load wheel assembly employing another alternative embodiment of a torque-coupling assembly with a force-applying coupling assembly positioned outside the wheel carrier.
Figure 12B:
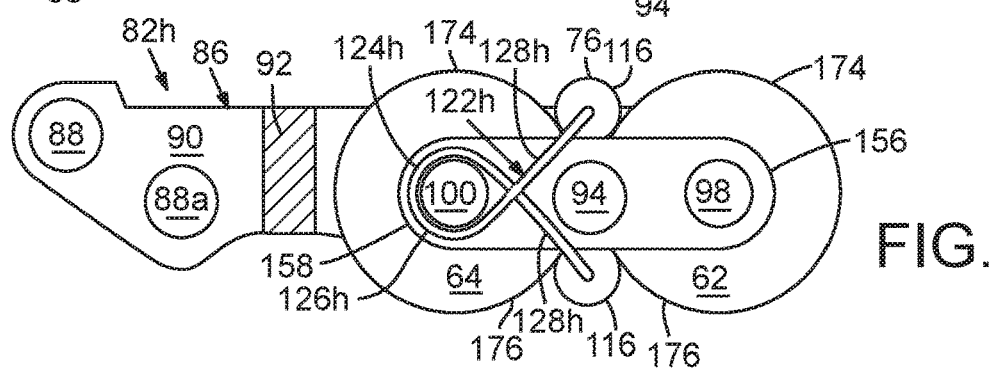
FIG. 12B is a side elevation view of the load wheel assembly of FIG. 12A with a wheel carrier strut and a portion of a wheel carrier bracket removed for clarity.
Figure 12C:
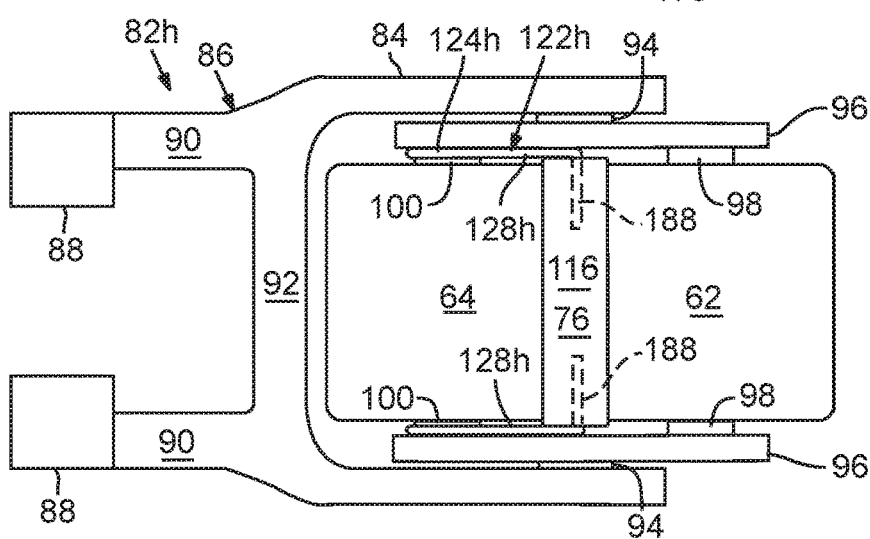
FIG. 12C is a top plan view of a load wheel assembly employing another alternative embodiment of a torque-coupling assembly with a force-applying coupling assembly positioned inside the wheel carrier.
Figure 12D:
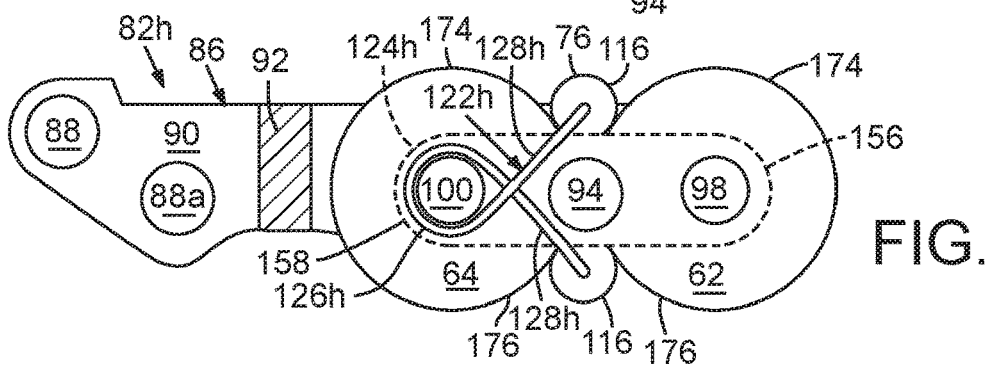
FIG. 12D is a side elevation view of the load wheel assembly of FIG. 12C with a wheel carrier strut and a portion of a wheel carrier bracket removed for clarity.

FIG. 12A is a top plan view of a load wheel assembly 82h employing another alternative embodiment of a torque-coupling assembly 80h with alternative force-applying coupler (or resilient force-applying coupler) 122h positioned outside the wheel carrier 96, and FIG. 12B is a side elevation view of the load wheel assembly 82h of FIG. 12A with a wheel carrier strut 84 and a portion of a wheel carrier bracket 86 removed for clarity. FIG. 12C is a top plan view of a load wheel assembly 82 employing alternative embodiment of a torque-coupling assembly 82h with a force-applying coupler positioned inside the wheel carrier 96, and FIG. 12D is a side elevation view of the load wheel assembly 82h of FIG. 12C with a wheel carrier strut 84 and a portion of a wheel carrier bracket 86 removed for clarity. The alternative torque-coupling assembly 80h employs top and bottom idler wheels 116 that may be identical or different. Differences might include one or more of idler wheel diameter 114, idler axle diameter, and idler wheel surface textures, etc.

The alternative force-applying coupler 122h may employ a torsion spring 124h that forces both the top and bottom idler wheels 116 against the upper surfaces 174 and lower surfaces 176 of the load wheels 62 and 64. The torsion spring 124h may include one or more axle loops 126h (a single loop or a helical component) that circle the one of the forward axle 98 of the forward load wheel 62 or the rear axle 100 of the rear load wheel 64.

In the embodiment shown in FIGS. 12A and 12B, the load wheel axle 98 or 100 or an extension of it, about which the torsion spring 124h is deployed, may extend out further beyond the wheel carrier 96 to provide greater support for the loop 126h of the torsion spring 124h. Such elongated load wheel axle 98 or 100 may extend to, or almost to, the wheel carrier 96 to prevent the torsion spring 124h from sliding off the load wheel axle 98 or 100. In the embodiment shown in FIGS. 12C and 12D, the torsion spring 124h is positioned between the wheel carrier 96 and the load wheel 64 (or 62) so the loop 126h of the torsion spring 124h cannot slide off of the load wheel axle 100 (or 98).

The torsion spring 124h may include two idler arms 128h that cross each other and are directly or indirectly connected to the separate idler wheels 116, such as to axles (not shown) of the idler wheels 116. Alternatively, the idler arms 128h may have auxiliary projections 188 that insert into the axles of the idler wheels 116 or that function as the axles of the idler wheels 116. In an alternative embodiment, the idler arms 128h may slide through an axle slot (not shown, but such as shown in FIG. 6C) in an idler axle (not shown, but such as shown in FIG. 6C) of the idler wheel 116 of the torque-coupling assembly 80h to provide force against the idler axle so that the force-applying coupler 122h urges the idler wheel 116 against the forward load wheel 62 and the rear load wheel 64. As noted previously, such a slot 138 may prevent rotation of the idler axle 120 in embodiments in which the idler wheel 116 constitutes a roller with bearings over the idler axle 120.

Typically, the torque-coupling assembly 80h employs a torsion spring 124h on each side of the wheel carrier 96. The torsion springs 124h can be employed around opposite sides of the same load wheel axle, or a first torsion spring 124h can be employed around the rear axle 100 one side of the wheel carrier 96 while a second torsion spring 124h can be employed around the forward axle 98 on the other side of the wheel carrier 96. One will appreciate that torsion springs 124h can be deployed around both the forward and rear axles 98 and 100 on both sides of the wheel carrier 96.

The torsion springs 124h urge the top and bottom idler wheels 116 toward each other so that they contact the respective the upper surfaces 174 and lower surfaces 176 of the load wheels 62 and 64 and couple the torque of the forward load wheel 62 and the rear load wheel 64. The strength of the torsion spring 124h and/or the diameter 114 of the idler wheel 116 can be adjusted to determine the relative elevation of the idler wheel surfaces with respect to the surfaces of the forward load wheel 62 and the rear load wheel 64. One will appreciate that the torque-coupling assembly 80h can be adapted so that the bottom of the bottom idler wheel 116 is at or above the bottom of the forward load wheel 62 and the rear load wheel 64.

Figure 13A:
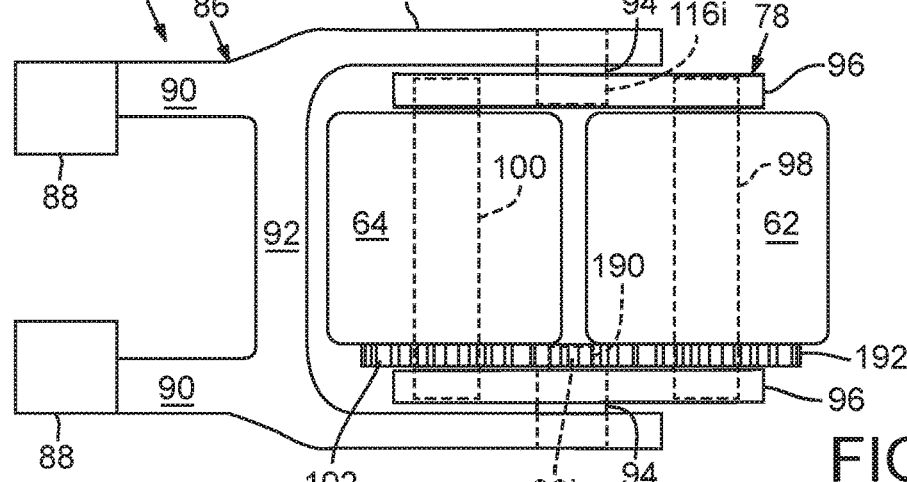
FIG. 13A is a top plan view of a load wheel assembly employing another alternative embodiment of a torque-coupling assembly.
Figure 13B:
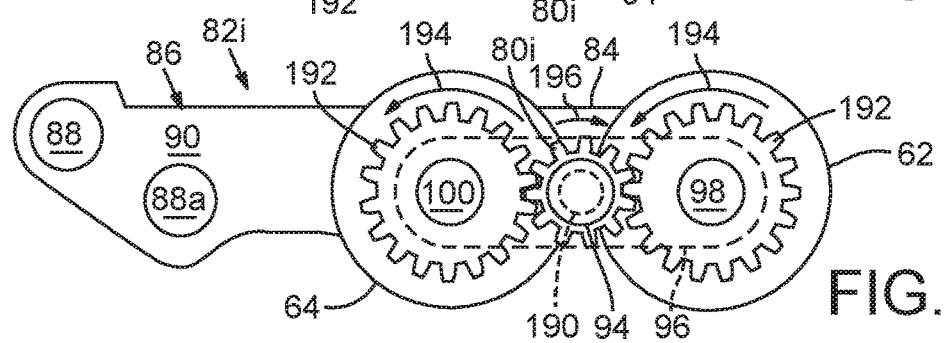
FIG. 13B is a side elevation view of the load wheel assembly of FIG. 13A with a wheel carrier strut and a portion of a wheel carrier bracket removed for clarity.

FIG. 13A is a top plan view of a load wheel assembly 82i employing another alternative embodiment of a torque-coupling assembly 80i, and FIG. 13B is a side elevation view of the load wheel assembly 82i of FIG. 13A with a wheel carrier strut 84 and a portion of a wheel carrier bracket 86 removed for clarity. The alternative torque-coupling assembly 80i employs an idler gear wheel 116i connected through bearings 190 to the wheel carrier 96. Alternatively, the torque-coupling assembly 80i employs idler gear wheels 116i connected through bearings 190 on opposite sides of the wheel carrier 96 and that may be identical or different. Differences might include the idler wheel gear diameter. Each idler gear wheel 116i interacts with one or more gears 192 that are fixed to the forward load wheel 62 and the rear load wheel 64 to transfer torque between them. Load wheel motion arrows 194 show the direction of rotation of the load wheels (and idler wheel motion arrow 196 shows the direction of motion of the idler gear wheel 116i) when the wheel carrier 96 moves backward. These arrows would be reversed when the wheel carrier 96 moves in the forward direction.

Figure 14A:
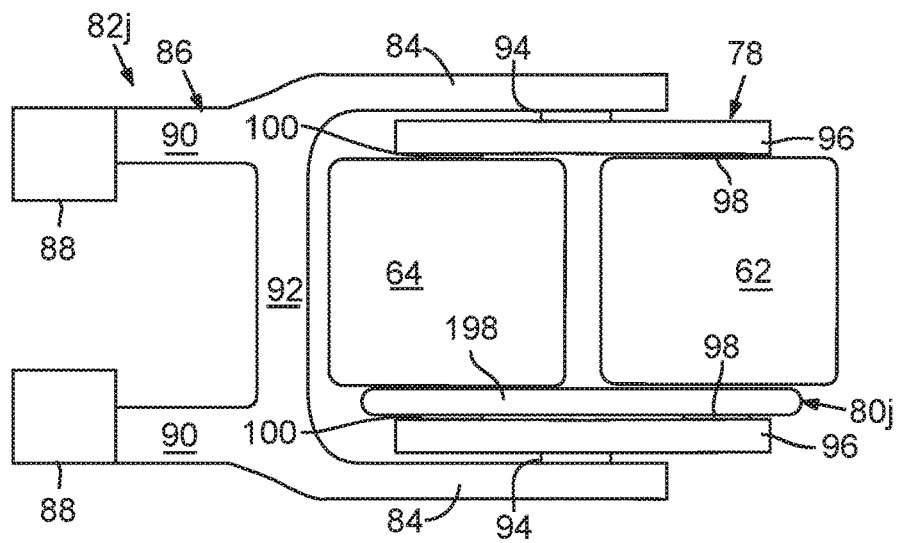
FIG. 14A is a top plan view of a load wheel assembly employing another alternative embodiment of a torque-coupling assembly.
Figure 14B:
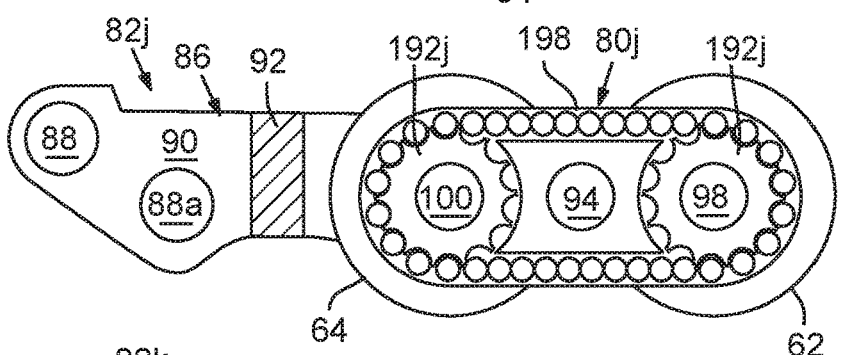
FIG. 14B is a side elevation view of the load wheel assembly of FIG. 14A with a wheel carrier strut and a portion of a wheel carrier bracket removed for clarity.

FIG. 14A is a top plan view of a load wheel assembly 82j employing another alternative embodiment of a torque-coupling assembly 80j, and FIG. 14B is a side elevation view of the load wheel assembly 82j of FIG. 14A with a wheel carrier strut 84 and a portion of a wheel carrier bracket 86 removed for clarity. The alternative torque-coupling assembly 80j employs a "raceway" 198 connected to the wheel carrier 96. Alternatively, the torque-coupling assembly 80j employs raceways 198, which may be identical or different, connected on opposite sides of the wheel carrier 96. Each raceway 198 interacts with one or more gears 192j that may be fixed to the forward load wheel 62 and the rear load wheel 64 to transfer torque between them.

This embodiment is based on the recirculating ball concept (also known as worm and sector or recirculating ball and nut), such as commonly used in steering systems and ball screws. However, in this embodiment, no screw is involved. The ball bearings are simply used to form the torque transfer device using a formed gear to push the balls along a raceway to the driven gear. The pushing force provides the torque transfer.

Figure 15A:
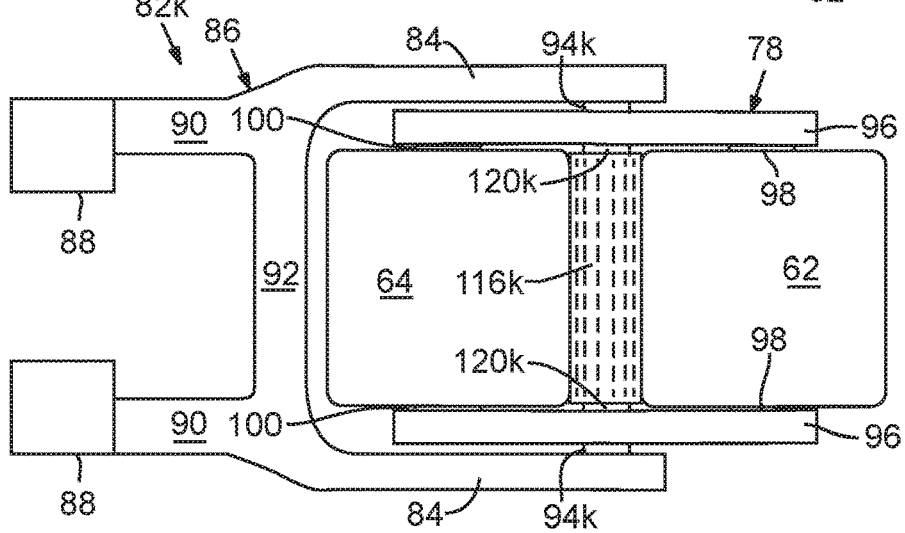
FIG. 15A is a top plan view of a load wheel assembly employing another alternative embodiment of a torque-coupling assembly.
Figure 15B:
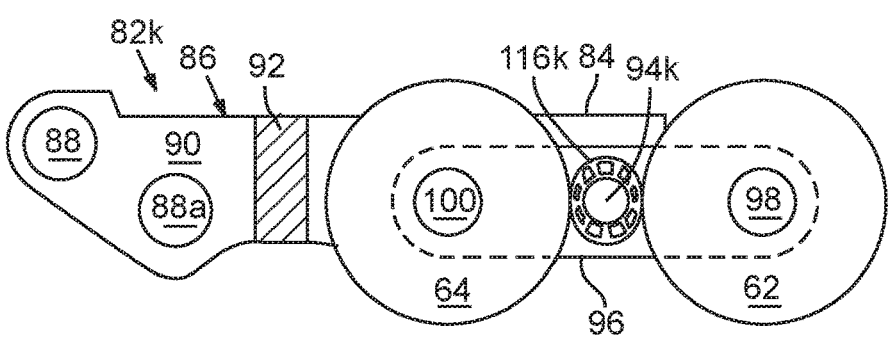
FIG. 15B is a side elevation view of the load wheel assembly of FIG. 15A with a wheel carrier strut and a portion of a wheel carrier bracket removed for clarity.

FIG. 15A is a top plan view of a load wheel assembly 82k employing another alternative embodiment of a torque-coupling assembly 80k, and FIG. 15B is a side elevation view of the load wheel assembly 82k of FIG. 15A with a wheel carrier strut 84 and a portion of a wheel carrier bracket 86 removed for clarity. The alternative torque-coupling assembly 80k employs an idler wheel 116k that has an idler wheel axle 120k that is aligned with the carrier axle 94k. Moreover, the carrier axle 94k and the idler wheel axle 120k may be a single component. One or both of the forward load wheel 62 and the rear load wheel 64 can be a smaller size than in the other embodiments, or the forward load wheel 62 and the rear load wheel 64 can be spaced further apart than in other embodiments to accommodate the diameter 114 of the idler wheel 116k. The diameter 114 of the idler wheel 116k and the material of the idler wheel 116k can be adapted to couple torque between the forward load wheel 62 and the rear load wheel 64. For example, the material of the idler wheel 116k may comprise an elastic material such as neoprene, polyurethane or Santoprene™ and may include longitudinal apertures 117k that facilitate the idler wheel 116k compressing when contacted by the surfaces of the load wheels 68. The stiffness of the material for the idler wheel 116k and the size and shape of the apertures 117k may be designed to increase or decrease the amount of pressure exerted by the idler wheel 116k on the forward load wheel 62 and the rear load wheel 64.

Figure 16A:
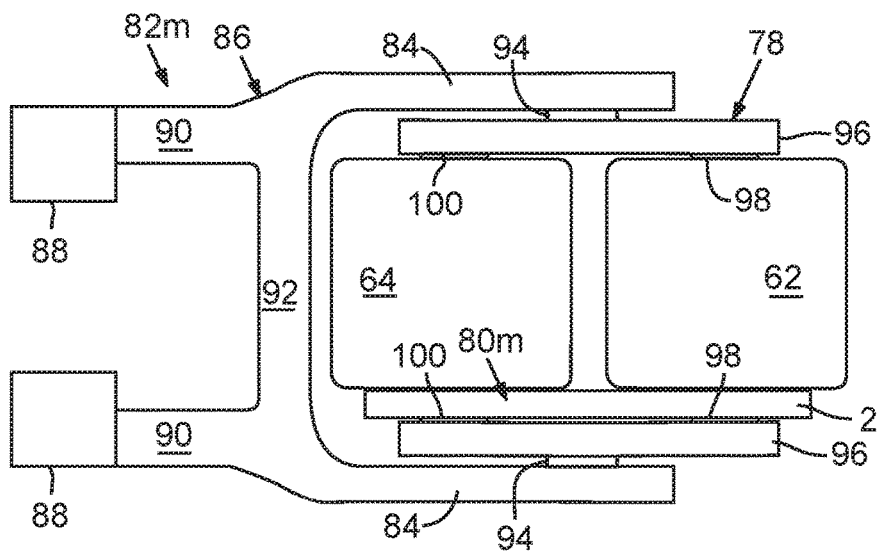
FIG. 16A is a top plan view of a load wheel assembly employing another alternative embodiment of a torque-coupling assembly.
Figure 16B:
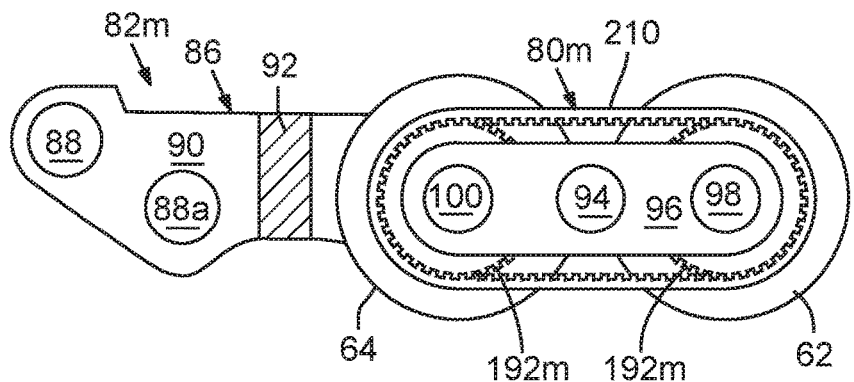
FIG. 16B is a side elevation view of the load wheel assembly of FIG. 16A with a wheel carrier strut and a portion of a wheel carrier bracket removed for clarity.

FIG. 16A is a top plan view of a load wheel assembly 82m employing another alternative embodiment of a torque-coupling assembly 80m, and FIG. 16B is a side elevation view of the load wheel assembly 82m of FIG. 16A with a wheel carrier strut 84 and a portion of a wheel carrier bracket 86 removed for clarity. The alternative torque-coupling assembly 80m employs one or more toothed belts 210 that may be on only one side of the wheel carrier 96 or on opposite sides of the wheel carrier 96. Each toothed belt 210 interacts with one or more gears or pulleys 192m that may be fixed to the forward load wheel 62 and the rear load wheel 64 to transfer torque between them.

Figure 16C:
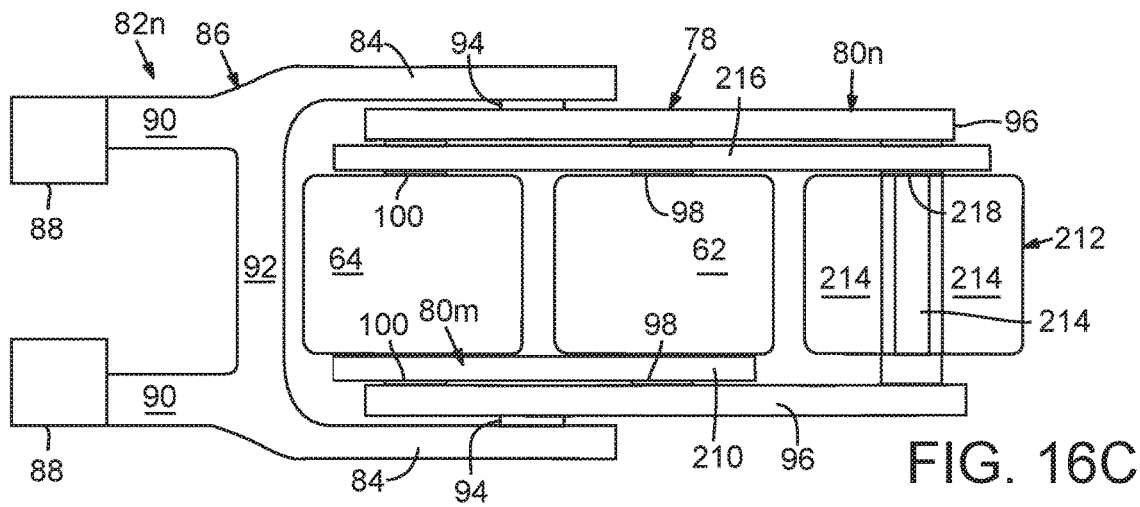
FIG. 16C is a top plan view of a load wheel assembly similar to that shown in FIG. 16A with an added lead-in roller in the form of a paddle wheel.
Figure 16D:
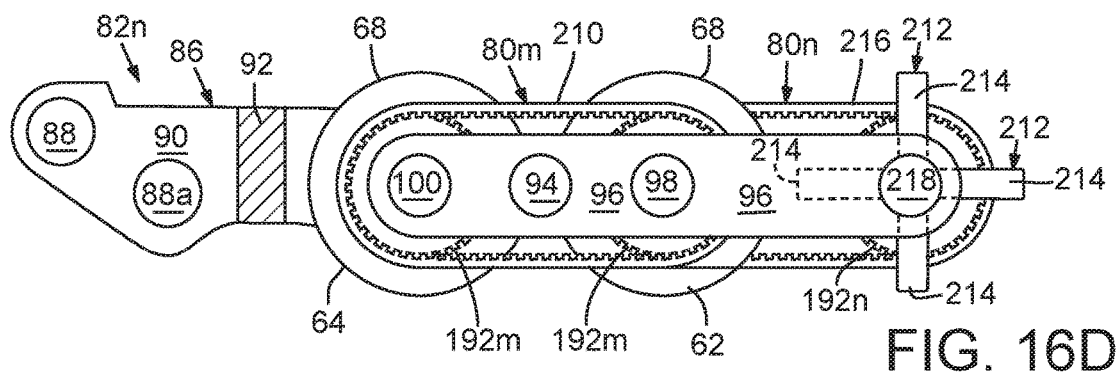
FIG. 16D is a first side elevation view of the load wheel assembly of FIG. 16D with a wheel carrier strut and a portion of a wheel carrier bracket removed for clarity.
Figure 16E:
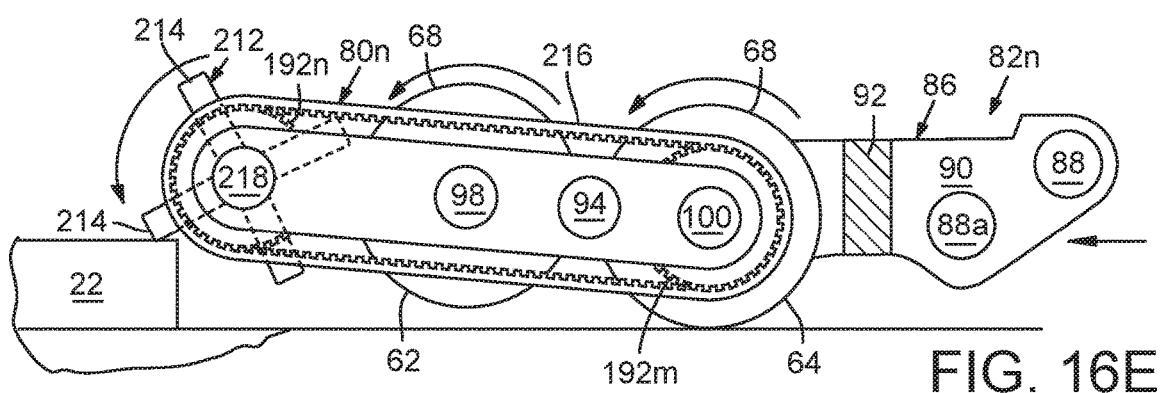
FIG. 16E is a second side elevation view of the load wheel assembly of FIG. 16D with a wheel carrier strut and a portion of a wheel carrier bracket removed for clarity.

FIG. 16C is a top plan view of a load wheel assembly 82n that is similar to that shown in FIG. 16A but additionally comprising a lead-in roller 212 in the form of a paddle wheel having multiple paddles 214. FIG. 16D is a first side elevation view of the load wheel assembly 82 with a wheel carrier strut 84 and a portion of a wheel carrier bracket 86 removed for clarity, and FIG. 16E is a second side elevation view of the load wheel assembly 82n with a wheel carrier strut 84 and a portion of a wheel carrier bracket 86 removed for clarity. FIGS. 16D and 16E are views from opposite sides of the load wheel assembly 82n.

The lead-in roller 212 is shown in the form of a paddle wheel having paddles 214; however, any type of wheel can be employed. By way of illustration and not limitation, the lead-in roller 212 may have, instead of paddles 214, other features on its surface, such ridges, bumps, or other surface texture to enable it to grip and climb over an obstacle, such as a base board 22, on the floor, rather than push it horizontally. As another example, the lead-in roller 212 may have a tacky outer surface, such as a rubber tire; alternatively, the entire lead-in roller may be made from a solid tacky material, such as rubber, a rubber-based compound, or a rubber-like material. The effective diameter of the lead-in roller 212 may be different from that of the load wheels 68. For example, the effective diameter of the lead-in roller 212 may be less than or equal to that of the load wheels 68, as the lead-in roller is preferably not load bearing like the load wheels 68; instead, the lead-in roller 212 is preferably meant to climb over an obstacle, such as a base board 22, on the floor but otherwise not contact a flat floor. To that end, the lead-in roller may have the same or different (larger or smaller) diameter as the load wheels 68 but positioned upward in a horizontally biased position relative to the load wheels 68. That may be accomplished, for example, by having bent wheel carriers 96 (e.g., right end up in FIG. 16D, left end up in FIG. 16E), instead of the straight ones illustrated in FIGS. 16D and 16E.

The lead-in roller 212 may be coupled to the torque of one or more of the load wheels 68 through a torque-coupling assembly 80n, which may employ, for example, a toothed belt 216 that interacts with a gear 192n connected to an axle 218 of the lead-in roller 212, as shown in FIGS. 16C-16E. One will appreciate that the torque-coupling assembly 80 may be employed to couple the lead-in roller 212 with only the rear load wheel 64, with only the forward load wheel 62, or with both of the rear load wheel 64 and the forward load wheel 62. One will further appreciate that the torque-coupling assembly 80n may be employed on only one side of the load wheel unit, as shown, or with both sides of the load wheel unit 78.

One will also appreciate that torque coupling between the lead-in roller 212 and one or both of the load wheels 68 can be implemented in any manner, such as by any of the force applying couplers 122a-122h. Other examples of mechanism to couple torque to the lead-in roller 212 include, for example, chain(s) and gears or untoothed belt(s). Similarly, the lead-in roller 212 may be utilized in conjunction with any other type of load wheel assembly, such as any of the load wheel assemblies 82-82k, or with load wheel assemblies that do not couple torque between their load wheels. Alternatively, the lead-in roller 212 may not be coupled to either of the load wheels 68.

FIG. 17A, FIG. 17B, and FIG. 17C illustrate respective top plan, right side elevation, bottom, and bottom right isometric views of an example of a modular fork assembly 36 that can be used as a fork 46 in a forked material-handling vehicle, such as a pallet truck 40. With reference to FIG. 17A, FIG. 17B, and FIG. 17C, each modular fork assembly 36 includes multiple components. A fully assembled modular fork assembly 36 includes an elongate body 60, a load wheel module 38, and a fork tip 66 (also referred to as a fork toe). A proximal or body-facing end 54 of the load wheel module 38 can be detachably connected to a distal end 50 (opposite the proximal end 54) of the elongate body 60, the distal end 50 being furthest from a battery box (not shown). And, the fork tip 66 can be detachably connected to a distal or fork tip-facing end 52 of the load wheel module 38. The elongate body 60, the load wheel module 38, and the fork tip 66 may be randomly selected from an inventory of respective substantially identical elongate bodies 60, load wheel modules 38, and fork tips 66.

For convenience and modularity, the elongate body 60, the load wheel module 38, and the fork tip 66 may be identical for both the left and right modular fork assemblies 36 (e.g., the fork assemblies 36 that may be coupled to the left and right sides of a battery box). Using identical components for both the left and right fork assemblies 36 increases the modularity of the system over a system in which the left and right forks are made with distinct, non-interchangeable components. However, distinct, non-identical exchangeable components may be used to create different left and right modular fork assemblies 36. For example, the elongate body 60 may be made in any desired length, detachably coupled to one of several different designs for the load wheel module 38, which is in turn detachably coupled to a desired fork tip 66 to create a customizable modular fork assembly 36 to accommodate a wide range of customer preferences. Load wheels with torque-coupling assemblies may be used in conventional fork configurations or other suitable environments as well.

Figure 18C:
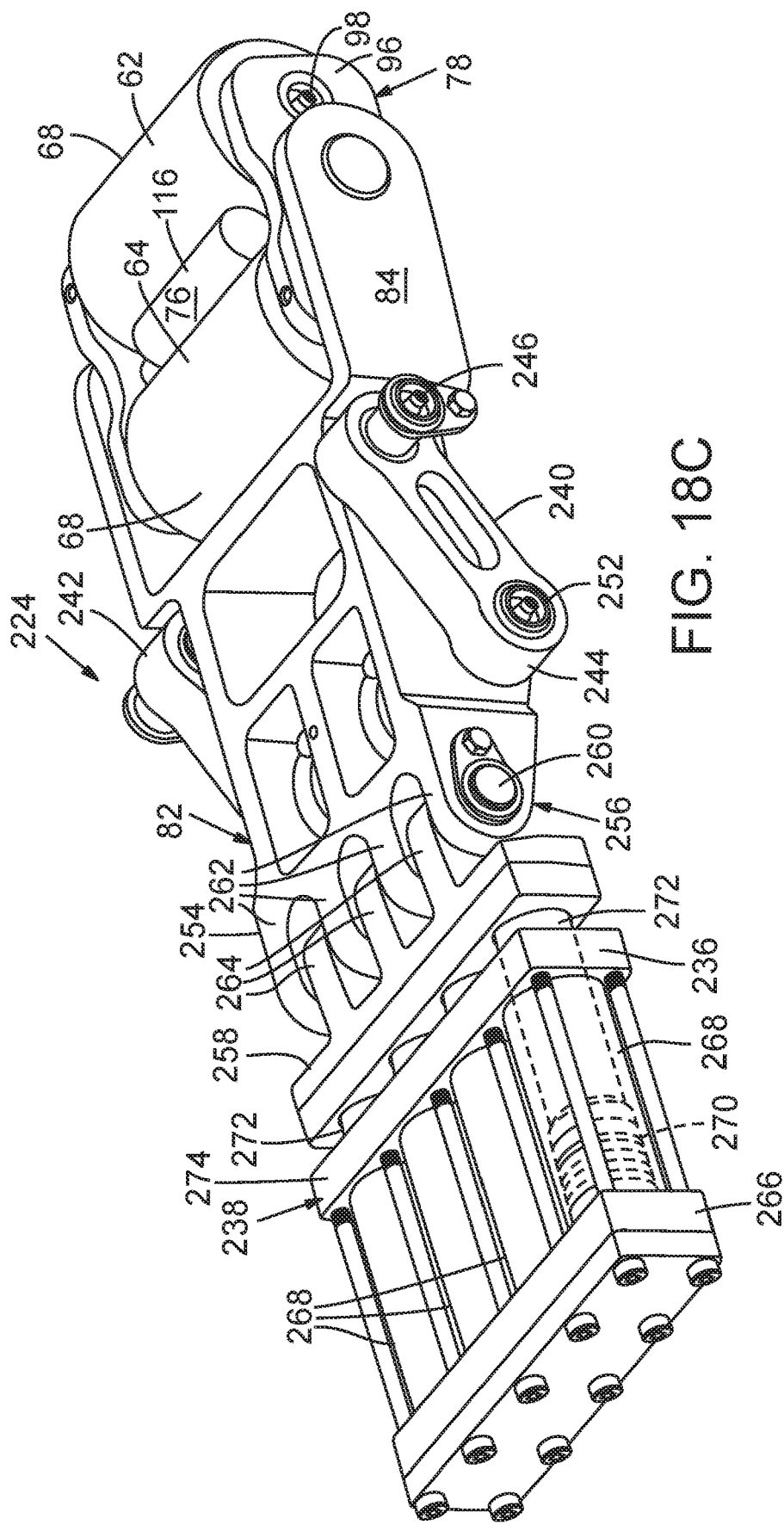
FIG. 18C illustrates a front right top isometric view of a wheel module substructure of a load wheel module, according to one embodiment.

FIG. 18A illustrates a front right bottom isometric view of a load wheel module 38 with a load wheel assembly 82 in an undeployed position 220; FIG. 18B illustrates a front right bottom isometric view of the load wheel module 38 with the load wheel assembly 82 in a deployed position 222; and FIG. 18C illustrates a front right top isometric view of a wheel module substructure 224. With reference to FIGS. 18A, 18B, and 18C, the load wheel module 38 may include any of the load wheel assemblies 82, or variations disclosed herein or other suitable variations, including their respective torque-coupling assemblies 80, or any variations disclosed herein or other suitable variations. The load wheel module 38 also includes a frame 226 that houses the wheel module substructure 224. The frame 226 includes a frame upper surface 228 and a frame lower surface 230. The frame upper surface 228 may be configured to support and provide sliding contact to a load, and the frame lower surface 230 may be configured to provide one or more points of contact with components of the wheel module substructure 224.

The frame 226 may have a body-facing end 54 and a fork tip-facing end 52 that may be substantially identical in shape or that may be different. For example, both of the body-facing end 54 and the fork tip-facing end 52 may be configured to include substantially identical interlocking mechanism components. In particular, the sheer-resistant features, such as protruding features (not shown) or the receiving features 232 may be identically positioned on both of the body-facing end 54 and the fork tip-facing end 52. The wheel module 38 depicted in FIG. 18A includes receiving features 232 configured into its fork tip-facing end 52. One will appreciate, however, that the body-facing end 54 and the fork tip-facing end 52 may have different types of sheer-resistant features in the same or different locations on each of the facing ends of the frame 226.

The frame 226 may also include an aperture 234 in both of the body-facing end 54 and the fork tip-facing end 52 if symmetry is desired for manufacturing. However, in some embodiments, only the body-facing end 54 of the frame 226 may include the aperture 234 to provide passage for a hydraulic line (not shown) that conveys hydraulic power from a hydraulic power source (not shown) to a hydraulic actuator 236 in the load wheel module 38. In other embodiments, the aperture 234 may provide passage for a mechanical link arm to facilitate lowering and raising a load wheel 68 via a suitable mechanical system coupled to the load wheel module 38, where the mechanical link arm receives a motive force from a power source located in a forklift truck body.

The wheel module substructure 224 may include a hydraulic actuator assembly 238 and a load wheel assembly 82 that is operatively connected to the frame 226. The load wheel assembly 82 includes a wheel carrier strut 84 (also called a wheel carrier frame) that is operatively connected to, and supports, the load wheel unit 78 that includes a wheel carrier 96 that supports the load wheels 68. In one example, the wheel carrier strut 84 has a U-shaped distal portion that is pivotally connected to the wheel carrier 96 on both sides of the load wheels 68.

The wheel module substructure 224 may be positioned within the frame 226 such that the hydraulic actuator assembly 238 is positioned closer to the body-facing end 54 of the load wheel module 38 and the load wheel assembly 82 is positioned closer to the fork tip-facing end 52 of the load wheel module 38. In particular, the hydraulic actuator 236 may be positioned closer to the body-facing end 54 and the load wheels 68 may be positioned closer to the fork tip-facing end 52.

The wheel carrier strut 84 is also operatively connected to the load wheel module frame 226 and to the hydraulic actuator assembly 238. In one example, the operative connection to the frame 226 may be implemented by one or more pivot bars 240 that may be pivotally connected at a bar frame end 242 to the frame 226 and at a bar strut end 244 to the wheel carrier strut 84. Part of a pivot mechanism 246 at the bar frame end 242 may be secured within a recess 248 in an exterior side surface 250 of the frame 226 so that the part of the pivot mechanism 246 will not catch when the modular fork assemblies 36 are slid into load structures that support the load. One will appreciate that other pivot mechanisms can additionally or alternatively be counter sunk into the components that they are pivoting. For example, although not depicted in this manner, part of the pivot mechanism 252 at the bar strut end 244 may be recessed into the pivot bar 240.

An actuator-facing end 254 of the wheel carrier strut 84 may be operatively connected to the hydraulic actuator assembly 238 via a pivot mechanism 256 at a strut-facing end 258 of the hydraulic actuator assembly 238. The pivot mechanism 256 may include a pivot 260 that extends through one or more strut teeth 262 at the actuator-facing end 254 of the wheel carrier strut 84 that are interweaved with one or more actuator assembly teeth 264 at the strut-facing end of the hydraulic actuator assembly 238.

The hydraulic actuator assembly 238 may include a hydraulic line input connector (also called a cap-end port) (not shown) operative for connecting the hydraulic actuator 236 to a hydraulic line (not shown) that transmits hydraulic fluid from a hydraulic power source (not shown). The hydraulic line input connector may supply a hydraulic manifold 266 that distributes hydraulic power from the hydraulic line into multiple hydraulic barrels (also called hydraulic cylinders) 268 that each include a piston 270 (shown in broken lines in FIG. 18C) that is operatively connected to a piston rod 272. In some embodiments, the hydraulic actuator 236 may include from one to ten pistons 270. FIG. 18C shows an example of a hydraulic actuator 236 that includes four hydraulic barrels 268, each of which includes a respective piston 270.

The load wheel unit 78 may rest in an undeployed position 220 when the hydraulic actuator 236 is not actively pushing the piston rods 272 beyond a cylinder head 274 of the piston assembly. The load wheel unit 78 may be deployed into a deployed position 222 in response to a load wheel deployment signal that may be provided by an automated system or may be provided in response to a manually activated input, such as a switch or button. The load wheel deployment signal directly or indirectly causes hydraulic power to be propagated through a hydraulic line positioned within the elongate body 60 of the modular fork assembly 36. The hydraulic power may be in the form of a hydraulic fluid under pressure.

The hydraulic line delivers the hydraulic power through the hydraulic line input connector to the hydraulic manifold 266 that distributes the hydraulic power to the hydraulic barrels 268 of the hydraulic actuator 236. The hydraulic power pushes the pistons 270 of the hydraulic actuator 236 so that the piston rods 272 extend beyond the cylinder head 274 to push against the actuator-facing end 254 of the wheel carrier strut 84, causing the pivot bar 240 to force the load wheel unit 78 to assume a predetermined deployed position 222 in which the load wheel unit 78 is vertically spaced apart from the load wheel module frame 226. One will appreciate that the hydraulic line and hydraulic actuator assembly 238 can be replaced by a link rod that is actuated close to the proximal end 48 of the elongate body 60 and a mechanical system coupled to the load wheel module 38 and arranged to lower and raise the load wheels 68 in response to movement of the link rod. For example, a suitable mechanical system may be coupled to a load wheel module 38 with a link rod extending through an elongate body 60 of a fork assembly 36 to mechanically connect the mechanical system with a power source such that force from the power source is transmitted via the link rod to the mechanical system to lower and raise the load wheels 68.

Modular fork assemblies 36 and load wheel modules are described in greater detail in U.S. patent application Ser. No. 16/367,050, entitled "Modular Fork Assembly for a Material-Handling Vehicle", filed Mar. 27, 2019, which is herein incorporated by reference.

Load wheels with torque-coupling assemblies may be used in conventional, non-modular, load wheel arrangements or other suitable environments as well.

The foregoing is illustrative of embodiments of the invention and is not to be construed as limiting thereof. Although a few specific example embodiments have been described, those skilled in the art will readily appreciate that many modifications to the disclosed example embodiments, as well as other embodiments, are possible without materially departing from the novel teachings and advantages of the invention.

Accordingly, all such modifications are intended to be included within the scope of the invention as defined in the claims. For example, skilled persons will appreciate that the subject matter of any sentence or paragraph can be combined with subject matter of some or all of the other sentences or paragraphs, except where such combinations are mutually exclusive.

It will be obvious to those having skill in the art that many changes may be made to the details of the above-described embodiments without departing from the underlying principles of the invention. The scope of the present invention should, therefore, be determined by the following claims, with equivalents of the claims to be included therein.

The invention claimed is:

1. A forked material-handling vehicle comprising:
   a chassis, and
   an elongate fork including a load wheel assembly, wherein the fork has a proximal end and a distal end, wherein the proximal end of the fork is directly or indirectly attached to the chassis, and wherein the load wheel assembly is connected to the fork closer to the distal end than to the proximal end, the load wheel assembly comprising:
   a non-motorized forward load wheel configured to directly roll on a floor;
   a non-motorized rear load wheel configured to directly roll on a floor; and
   a non-motorized torque-coupling assembly connected between the forward load wheel and the rear load wheel for coupling torque between the forward load wheel and the rear load wheel, wherein the torque-coupling assembly comprises a force-applying coupling assembly configured to elastically couple torque between the forward load wheel and the rear load wheel.

2. The forked material-handling vehicle of claim 1, wherein the torque-coupling assembly comprises a torque-coupling means for coupling torque between the forward load wheel and the rear load wheel.

3. The forked material-handling vehicle of claim 1, wherein the torque-coupling assembly comprises an idler wheel.

4. The forked material-handling vehicle of claim 3, wherein the idler wheel comprises a polymer, polyurethane, or a metal.

5. The forked material-handling vehicle of claim 1, wherein the torque-coupling assembly includes an idler wheel having an idler wheel surface, and wherein the idler wheel surface has direct contact with a forward load wheel surface of the forward load wheel and a rear load wheel surface of the rear load wheel.

6. The forked material-handling vehicle of claim 1, wherein the torque-coupling assembly is positioned above the forward load wheel and the rear load wheel.

7. A forked material-handling vehicle comprising:
a chassis, and
an elongate fork including a load wheel assembly, wherein the fork has a proximal end and a distal end, wherein the proximal end of the fork is directly or indirectly attached to the chassis, and wherein the load wheel assembly is connected to the fork closer to the distal end than to the proximal end, the load wheel assembly comprising:
a non-motorized forward load wheel configured to directly roll on a floor;
a non-motorized rear load wheel configured to directly roll on a floor; and
a non-motorized torque-coupling assembly connected between the forward load wheel and the rear load wheel for coupling torque between the forward load wheel and the rear load wheel, wherein the forward load wheel has a forward wheel radius, wherein the rear load wheel has a rear wheel radius, wherein the torque-coupling assembly comprises an idler wheel having an idler wheel diameter, and wherein the idler wheel diameter is smaller than or equal to the forward wheel radius and the rear wheel radius.

8. The forked material-handling vehicle of claim 1, wherein the forward load wheel has a forward wheel height above the ground, wherein the rear load wheel has a rear wheel height above the ground, wherein the torque-coupling assembly comprises an idler wheel having an idler wheel height above the ground, and wherein the idler wheel height is shorter than or equal to the greater of the forward wheel height and the rear wheel height.

9. A forked material-handling vehicle comprising:
a chassis, and
an elongate fork including a load wheel assembly, wherein the fork has a proximal end and a distal end, wherein the proximal end of the fork is directly or indirectly attached to the chassis, and wherein the load wheel assembly is connected to the fork closer to the distal end than to the proximal end, the load wheel assembly comprising:
a non-motorized forward load wheel configured to directly roll on a floor;
a non-motorized rear load wheel configured to directly roll on a floor; and
a non-motorized torque-coupling assembly connected between the forward load wheel and the rear load wheel for coupling torque between the forward load wheel and the rear load wheel, wherein the forward load wheel has a forward wheel height above the ground, wherein the rear load wheel has a rear wheel height above the ground, wherein the torque-coupling assembly comprises an idler wheel having an idler wheel height above the ground, and wherein the idler wheel height is within 5% of the greater of the forward wheel height and the rear height.

10. The forked material-handling vehicle of claim 7, wherein the torque-coupling assembly comprises a resilient force-applying coupling assembly configured to elastically couple torque between the forward load wheel and the rear load wheel.

11. The forked material-handling vehicle of claim 1, wherein the torque-coupling assembly comprises a resilient force-applying coupling assembly that comprises one or more of a torsion spring, a tension spring, a leaf spring, a spring plate, and a spring-loaded clip.

12. The forked material-handling vehicle of claim 1, wherein the torque-coupling assembly comprises an idler wheel, wherein the forward load wheel has a forward axle assembly, wherein the rear wheel has a rear axle assembly, wherein the idler wheel has an idler axle, wherein the torque-coupling assembly is indirectly connected to the idler axle, and wherein the torque-coupling assembly at least partly directly or indirectly surrounds the forward axle assembly or the rear axle assembly.

13. A forked material-handling vehicle comprising:
a chassis, and
an elongate fork including a load wheel assembly, wherein the fork has a proximal end and a distal end, wherein the proximal end of the fork is directly or indirectly attached to the chassis, and wherein the load wheel assembly is connected to the fork closer to the distal end than to the proximal end, the load wheel assembly comprising:
a non-motorized forward load wheel configured to directly roll on a floor;
a non-motorized rear load wheel configured to directly roll on a floor; and
a non-motorized torque-coupling assembly connected between the forward load wheel and the rear load wheel for coupling torque between the forward load wheel and the rear load wheel, further including at least one of first and second wheel carriers, wherein the torque-coupling assembly comprises a resilient force-applying coupling assembly that is connected directly or indirectly to the first wheel carrier or the second wheel carrier.

14. The forked material-handling vehicle of claim 1, further including at least one of first and second wheel carriers, wherein the first wheel carrier or the second wheel carrier has a forward pocket and a rear pocket positioned higher than the respective forward load wheel and the rear load wheel, wherein the torque-coupling assembly comprises an idler wheel having an idler axle, wherein the torque-coupling assembly extends from the forward pocket to the rear pocket and arcs over at least a portion of the idler axle to resiliently force the idler axle toward the forward load wheel and the rear load wheel.

15. The forked material-handling vehicle of claim 1, wherein the torque-coupling assembly comprises a resilient force-applying coupling assembly, wherein the torque-coupling assembly comprises an idler wheel having an idler axle that comprises an idler slot, and wherein a portion of the resilient force-applying coupling assembly passes through the idler slot.

16. The forked material-handling vehicle of claim 1, further including a wheel carrier, wherein the torque-coupling assembly comprises a resilient force-applying coupling assembly that comprises fastener slots adapted to receive a fastener that secures the resilient force-applying coupling assembly to the wheel carrier.

17. The forked material-handling vehicle of claim 1, further including at least one of first and second wheel carriers, wherein the torque-coupling assembly comprises an idler wheel having an idler axle, wherein the torque-coupling assembly comprises a tension plate that covers at least a portion of the idler axle and is resiliently forced toward the first wheel carrier or the second wheel carrier.

18. The forked material-handling vehicle of claim 1, further including at least one of first and second wheel carriers, wherein the torque-coupling assembly comprises a resilient force-applying coupling assembly that is attached to both forward and rear portions of the first wheel carrier or both forward and rear portions of the second wheel carrier.

19. The forked material-handling vehicle of claim 1, further including at least one of first and second wheel carriers, wherein the torque-coupling assembly comprises a resilient force-applying coupling assembly that fits around both forward and rear ends of the first wheel carrier or both forward and rear ends of the second wheel carrier.

20. The forked material-handling vehicle of claim 1, wherein the torque-coupling assembly comprises:
 an upper idler wheel positioned above the forward and rear load wheels;
 a lower idler wheel positioned beneath the forward and rear load wheels; and
 a resilient force-applying coupling assembly that directly or indirectly connects the upper idler wheel and the lower idler wheel and resiliently forces them toward each other.

21. The forked material-handling vehicle of claim 1, wherein the elongate fork comprises:
 a discrete elongate body;
 a discrete load wheel module, which includes the load wheel assembly;
 a first interlocking mechanism detachably connecting the elongate body to the load wheel module;
 a discrete fork tip; and
 a second interlocking mechanism detachably connecting the load wheel module to the fork tip.

22. The forked material-handling vehicle of claim 1, further comprising a discrete load wheel module which includes the load wheel assembly, wherein the load wheel module further comprises:
 a frame, wherein the load wheel assembly is operatively connected to the frame; and
 a hydraulic actuator contained within the frame and operatively connected to the load wheel assembly to lower the load wheel hydraulically.

23. The forked material-handling vehicle of claim 9, wherein the idler wheel has direct contact with the forward load wheel and the rear load wheel, wherein the torque-coupling assembly comprises a resilient force-applying coupling assembly configured to elastically urge the idler wheel into contact with the forward load wheel and the rear load wheel.

24. A forked material-handling vehicle comprising:
 a chassis, and
 an elongate fork including a load wheel assembly, wherein the fork has a proximal end and a distal end, wherein the proximal end of the fork is directly or indirectly attached to the chassis, and wherein the load wheel assembly is connected to the fork closer to the distal end than to the proximal end, the load wheel assembly comprising:
  a non-motorized forward load wheel configured to directly roll on a floor;
  a non-motorized rear load wheel configured to directly roll on a floor; and
  a non-motorized torque-coupling assembly connected between the forward load wheel and the rear load wheel for coupling torque between the forward load wheel and the rear load wheel, wherein the torque-coupling assembly comprises a resilient force-applying coupling means configured to elastically couple torque between the forward load wheel and the rear load wheel.

25. A pallet truck, comprising:
 a steer wheel;
 a chassis operatively connected to the steer wheel; and
 substantially parallel first and second forks operatively connected to and extending from the chassis and configured to hold a load for conveyance by the pallet truck as the pallet truck moves, wherein the first fork comprises a first elongate body, a first load wheel assembly, and a first fork tip, wherein the second fork comprises a second elongate body, a second load wheel assembly, and a second fork tip, wherein the first load wheel assembly comprises a first non-motorized forward load wheel configured to directly roll on a floor, a first non-motorized rear load wheel configured to directly roll on a floor, and a first non-motorized torque-coupling means connected between the first forward load wheel and the first rear load wheel, and wherein the second load wheel assembly comprises a second non-motorized forward load wheel configured to directly roll on a floor, a second non-motorized rear load wheel configured to directly roll on a floor, and a second non-motorized torque-coupling means connected between the second forward load wheel and the second rear load wheel, wherein the first or second torque-coupling means comprises a force-applying coupling assembly configured to elastically couple torque between the forward load wheel and the rear load wheel.

26. A forked material-handling vehicle comprising:
 a chassis, and
 an elongate fork, and a load wheel assembly, wherein the fork has a proximal end and a distal end, wherein the proximal end of the fork is directly or indirectly attached to the chassis, and wherein the load wheel assembly is connected to the fork closer to the distal end than to the proximal end, the load wheel assembly comprising:
  a non-motorized forward load wheel configured to directly roll on a floor;
  a non-motorized rear load wheel configured to directly roll on a floor; and
  a torque-coupling means for coupling torque between the forward load wheel and the rear load wheel, wherein the torque-coupling means comprises a force-applying coupling assembly configured to elastically couple torque between the forward load wheel and the rear load wheel.

27. The forked material-handling vehicle of claim 1, wherein the torque-coupling assembly has an assembly bottom that is configured to be spaced apart from a floor.

28. The forked material-handling vehicle of claim 1, wherein the torque-coupling assembly comprises an idler wheel, wherein the idler wheel is configured to directly couple force between the forward load wheel and the rear load wheel.

29. A forked material-handling vehicle comprising:
 a chassis, and
 an elongate fork including a load wheel assembly, wherein the fork has a proximal end and a distal end, wherein the proximal end of the fork is directly or indirectly attached to the chassis, and wherein the load wheel assembly is connected to the fork closer to the distal end than to the proximal end, the load wheel assembly comprising:
- a non-motorized forward load wheel;
- a non-motorized rear load wheel; and
- a non-motorized torque-coupling assembly connected between the forward load wheel and the rear load wheel for coupling torque between the forward load wheel and the rear load wheel, wherein the torque-coupling assembly comprises an idler wheel, wherein the idler wheel has direct contact with the forward load wheel and the rear load wheel, wherein the torque-coupling assembly comprises a resilient force-applying coupling assembly configured to elastically urge the idler wheel into contact with the forward load wheel and the rear load wheel.

30. The forked material-handling vehicle of claim 29, wherein the forward load wheel has a forward wheel radius, wherein the rear load wheel has a rear wheel radius, wherein the torque-coupling assembly comprises an idler wheel having an idler wheel diameter, and wherein the idler wheel diameter is smaller than or equal to the forward wheel radius and the rear wheel radius.

31. The forked material-handling vehicle of claim 29, wherein the forward load wheel has a forward wheel height above the ground, wherein the rear load wheel has a rear wheel height above the ground, wherein the torque-coupling assembly comprises an idler wheel having an idler wheel height above the ground, and wherein the idler wheel height is within 5% of the greater of the forward wheel height and the rear height.

32. The pallet truck of claim 25, wherein the first non-motorized forward load wheel has a forward wheel radius, wherein the first non-motorized rear load wheel has a rear wheel radius, wherein the first non-motorized torque-coupling means comprises an idler wheel having an idler wheel diameter, and wherein the idler wheel diameter is smaller than or equal to the forward wheel radius and the rear wheel radius.

33. The pallet truck of claim 25, wherein the first non-motorized forward load wheel has a forward wheel height above the ground, wherein the first non-motorized rear load wheel has a rear wheel height above the ground, wherein the first non-motorized torque-coupling means comprises an idler wheel having an idler wheel height above the ground, and wherein the idler wheel height is within 5% of the greater of the forward wheel height and the rear height.

34. The pallet truck of claim 25, wherein the first non-motorized torque-coupling means comprises a resilient force-applying coupling assembly that comprises one or more of a torsion spring, a tension spring, a leaf spring, a spring plate, and a spring-loaded clip.

35. The pallet truck of claim 25, wherein the first non-motorized torque-coupling means comprises a resilient force-applying coupling assembly, wherein the first non-motorized torque-coupling means comprises an idler wheel having an idler axle that comprises an idler slot, and wherein a portion of the resilient force-applying coupling assembly passes through the idler slot.

36. The pallet truck of claim 25, further including a wheel carrier, wherein the first non-motorized torque-coupling means comprises a resilient force-applying coupling assembly that comprises fastener slots adapted to receive a fastener that secures the resilient force-applying coupling assembly to the wheel carrier.

37. The pallet truck of claim 25, further including at least one of first and second wheel carriers, wherein the first non-motorized torque-coupling means comprises an idler wheel having an idler axle, wherein the first non-motorized torque-coupling means comprises a tension plate that covers at least a portion of the idler axle and is resiliently forced toward the first wheel carrier or the second wheel carrier.

38. The pallet truck of claim 25, further including at least one of first and second wheel carriers, wherein the first non-motorized torque-coupling means comprises a resilient force-applying coupling assembly that is attached to both forward and rear portions of the first wheel carrier or both forward and rear portions of the second wheel carrier.

39. The pallet truck of claim 25, further including at least one of first and second wheel carriers, wherein the first non-motorized torque-coupling means comprises a resilient force-applying coupling assembly that fits around both forward and rear ends of the first wheel carrier or both forward and rear ends of the second wheel carrier.

40. The forked material-handling vehicle of claim 1, wherein the forked material-handling vehicle comprises a pallet truck.

41. The forked material-handling vehicle of claim 29, wherein the forked material-handling vehicle comprises a pallet truck.

\* \* \* \* \*